(12) United States Patent
O'Neill et al.

(10) Patent No.: US 10,457,441 B2
(45) Date of Patent: Oct. 29, 2019

(54) CASE FOR A COMMUNICATION DEVICE

(71) Applicant: Portero Holdings, LLC, Lake Forest, CA (US)

(72) Inventors: Patrick D. O'Neill, Huntington Beach, CA (US); Chong Pak, Lakewood, CA (US)

(73) Assignee: Portero Holdings, LLC, Lake Forest, CA (US)

( * ) Notice: Subject to any disclaimer, the term of this patent is extended or adjusted under 35 U.S.C. 154(b) by 968 days.

(21) Appl. No.: 13/733,850

(22) Filed: Jan. 3, 2013

(65) Prior Publication Data
US 2013/0206614 A1 Aug. 15, 2013

Related U.S. Application Data

(60) Provisional application No. 61/585,837, filed on Jan. 12, 2012, provisional application No. 61/583,546, filed on Jan. 5, 2012.

(51) Int. Cl.
*B65D 6/00* (2006.01)
*H04B 1/3888* (2015.01)
(Continued)

(52) U.S. Cl.
CPC .............. *B65D 11/00* (2013.01); *B23P 19/04* (2013.01); *G06F 1/1632* (2013.01);
(Continued)

(58) Field of Classification Search
CPC ......... B65D 11/00; B65D 11/18; B65D 11/20; B23P 19/04; G06F 1/1632; G06F 1/1635;
(Continued)

(56) References Cited

U.S. PATENT DOCUMENTS 3,140,905 A 7/1964 Trotter et al.
3,575,485 A 4/1971 MacMaster
(Continued)

FOREIGN PATENT DOCUMENTS

CN 2694645 4/2005
WO WO 2013/103845 7/2013

OTHER PUBLICATIONS

U.S. Appl. No. 29/441,469 and prosecution history, filed Jan. 4, 2013, O'Neill et al.

*Primary Examiner* — Anthony D Stashick
*Assistant Examiner* — Blaine G Neway
(74) *Attorney, Agent, or Firm* — Dorsey & Whitney LLP

(57) ABSTRACT

Some embodiments disclosed herein relate to a case for a communication device, having two or more portions movable with respect to each other. A first case portion may cover a particular component or area of the communication device. Accessories or auxiliary structures may be available for use with the particular component, and may be configured to attach to or be used with a communication device housing of a particular size or shape. The first case portion may be moved relative to a second case portion, thereby exposing the component or area of the communication device for use with the accessory. Additional embodiments disclosed herein related to modular components that may be used with cases in order to provide various accessories and features, such as mounts, flashes, batteries, and the like.

13 Claims, 15 Drawing Sheets

(51) Int. Cl.
  *B23P 19/04* (2006.01)
  *H04M 1/02* (2006.01)
  *H04M 1/04* (2006.01)
  *G06F 1/16* (2006.01)

(52) U.S. Cl.
  CPC ........ *H04B 1/3888* (2013.01); *H04M 1/0264* (2013.01); *H04M 1/04* (2013.01); *G06F 1/1635* (2013.01); *G06F 2200/1633* (2013.01); *H04M 1/0235* (2013.01); *Y10T 29/49826* (2015.01)

(58) Field of Classification Search
  CPC ........... G06F 220/1633; H04B 1/3888; H04M 1/0264; H04M 1/04; H04M 1/0235; Y10T 29/49826
  USPC ................................................. 206/320, 216
  See application file for complete search history.

(56) References Cited

U.S. PATENT DOCUMENTS

| | | | |
|---|---|---|---|
| 4,420,078 A * | 12/1983 | Belt | A61N 1/37 206/305 |
| 4,972,306 A | 11/1990 | Bornhorst | |
| 5,070,407 A | 12/1991 | Wheeler et al. | |
| 5,541,686 A | 7/1996 | Stephenson | |
| 5,907,721 A * | 5/1999 | Schelling | G03B 17/08 206/316.2 |
| 6,325,353 B1 * | 12/2001 | Jiang | G06F 1/184 248/682 |
| 6,356,441 B1 | 3/2002 | Claprood | |
| D565,290 S | 4/2008 | Brandenburg et al. | |
| 7,536,210 B1 | 5/2009 | Morris et al. | |
| 7,847,860 B2 | 12/2010 | Kim | |
| 8,023,263 B2 | 9/2011 | Crippen | |
| 8,068,332 B2 * | 11/2011 | Yang | H04M 1/0202 224/254 |
| 8,073,324 B2 | 12/2011 | Tsai | |
| D663,263 S | 7/2012 | Gupta et al. | |
| 8,226,306 B2 | 7/2012 | Chou | |
| 8,279,544 B1 | 10/2012 | O'Neill | |
| D676,432 S * | 2/2013 | Hasbrook | D14/250 |
| D677,250 S | 3/2013 | Takamoto | |
| D679,695 S | 4/2013 | Fahrendorff et al. | |
| D684,567 S | 6/2013 | Murchison et al. | |
| 8,593,745 B2 | 11/2013 | O'Neill | |
| 8,640,867 B2 * | 2/2014 | Szucs | A45C 11/00 206/320 |
| D706,271 S | 6/2014 | Gelsomini et al. | |
| 8,760,569 B2 | 6/2014 | Yang | |
| D709,439 S | 7/2014 | Ferber et al. | |
| D709,485 S | 7/2014 | Bishop | |
| D714,275 S | 9/2014 | Tompkin | |
| 8,891,187 B2 | 11/2014 | O'Neill | |
| 8,954,117 B2 * | 2/2015 | Huang | H04B 1/3883 455/343.6 |
| 9,195,023 B2 | 11/2015 | O'Neill et al. | |
| 2002/0160724 A1 | 10/2002 | Arai et al. | |
| 2003/0122957 A1 | 7/2003 | Emme | |
| 2005/0245295 A1 | 11/2005 | Lee et al. | |
| 2007/0216796 A1 | 9/2007 | Lenel et al. | |
| 2007/0241012 A1 | 10/2007 | Latchford et al. | |
| 2007/0261978 A1 | 11/2007 | Sanderson | |
| 2007/0280677 A1 | 12/2007 | Drake et al. | |
| 2008/0094786 A1 | 4/2008 | Liou et al. | |
| 2008/0273112 A1 | 11/2008 | Sladen | |
| 2009/0109325 A1 | 4/2009 | Imai et al. | |
| 2009/0109558 A1 | 4/2009 | Schaefer | |
| 2009/0181729 A1 | 7/2009 | Griffin, Jr. et al. | |
| 2009/0203398 A1 | 8/2009 | Griffin | |
| 2009/0237812 A1 | 9/2009 | Tseng et al. | |
| 2010/0065454 A1 * | 3/2010 | Badillo | A45C 9/00 206/320 |
| 2010/0200456 A1 | 8/2010 | Parkinson | |
| 2010/0300909 A1 * | 12/2010 | Hung | H04M 1/04 206/320 |
| 2010/0328420 A1 | 12/2010 | Roman | |
| 2011/0009174 A1 | 1/2011 | Ladouceur et al. | |
| 2011/0073505 A1 | 3/2011 | Stiehl | |
| 2011/0097070 A1 | 4/2011 | Kirokawa et al. | |
| 2011/0192857 A1 | 8/2011 | Rothbaum et al. | |
| 2011/0272305 A1 | 11/2011 | Lee | |
| 2011/0286199 A1 | 11/2011 | Miikkola et al. | |
| 2011/0309728 A1 | 12/2011 | Diebel | |
| 2012/0088558 A1 * | 4/2012 | Song | H04M 1/18 455/575.1 |
| 2012/0112031 A1 * | 5/2012 | Gormick | A45C 11/00 248/371 |
| 2012/0236424 A1 | 9/2012 | Yang | |
| 2012/0245422 A1 | 9/2012 | Hasbun | |
| 2012/0257008 A1 | 10/2012 | Taylor | |
| 2012/0321294 A1 | 12/2012 | Tages et al. | |
| 2013/0028591 A1 | 1/2013 | Hicks | |
| 2013/0032617 A1 | 2/2013 | Adelman et al. | |
| 2013/0063004 A1 | 3/2013 | Lai et al. | |
| 2013/0069499 A1 | 3/2013 | Modrell | |
| 2013/0121677 A1 | 5/2013 | Yeh et al. | |
| 2013/0127309 A1 | 5/2013 | Wyner et al. | |
| 2013/0135871 A1 | 5/2013 | Harooni | |
| 2013/0177304 A1 | 7/2013 | Chapman et al. | |
| 2013/0182387 A1 | 7/2013 | Mere et al. | |
| 2013/0220847 A1 | 8/2013 | Fisher et al. | |
| 2013/0240578 A1 | 9/2013 | Yu | |
| 2013/0329115 A1 | 12/2013 | Palmeri | |
| 2013/0335315 A1 | 12/2013 | Bonnat | |
| 2014/0063049 A1 | 3/2014 | Armstrong-Muntner | |
| 2014/0132781 A1 | 5/2014 | Adams et al. | |
| 2014/0171150 A1 | 6/2014 | Hurst et al. | |
| 2014/0360893 A1 | 12/2014 | Whitten et al. | |
| 2015/0177147 A1 | 6/2015 | Mangan et al. | |
| 2015/0358446 A1 | 12/2015 | Bergreen | |

\* cited by examiner

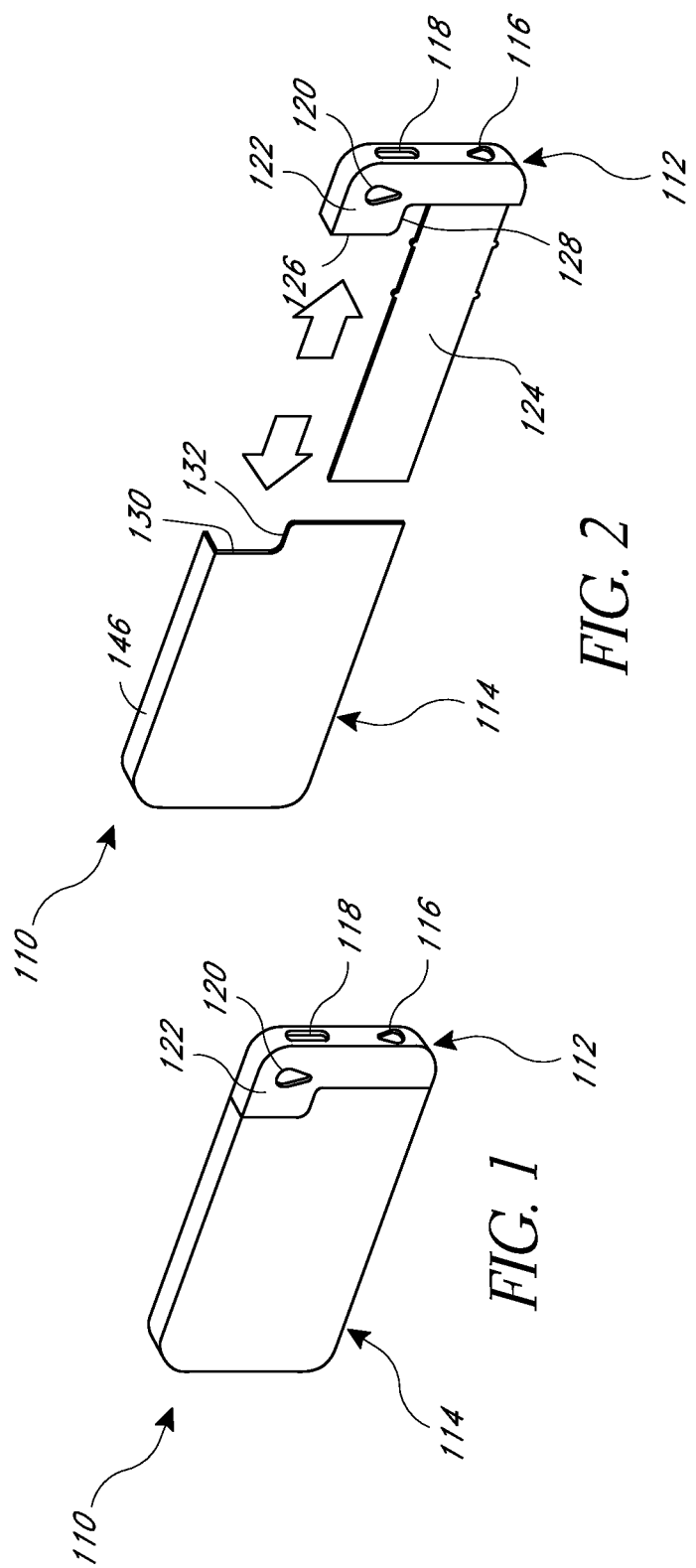

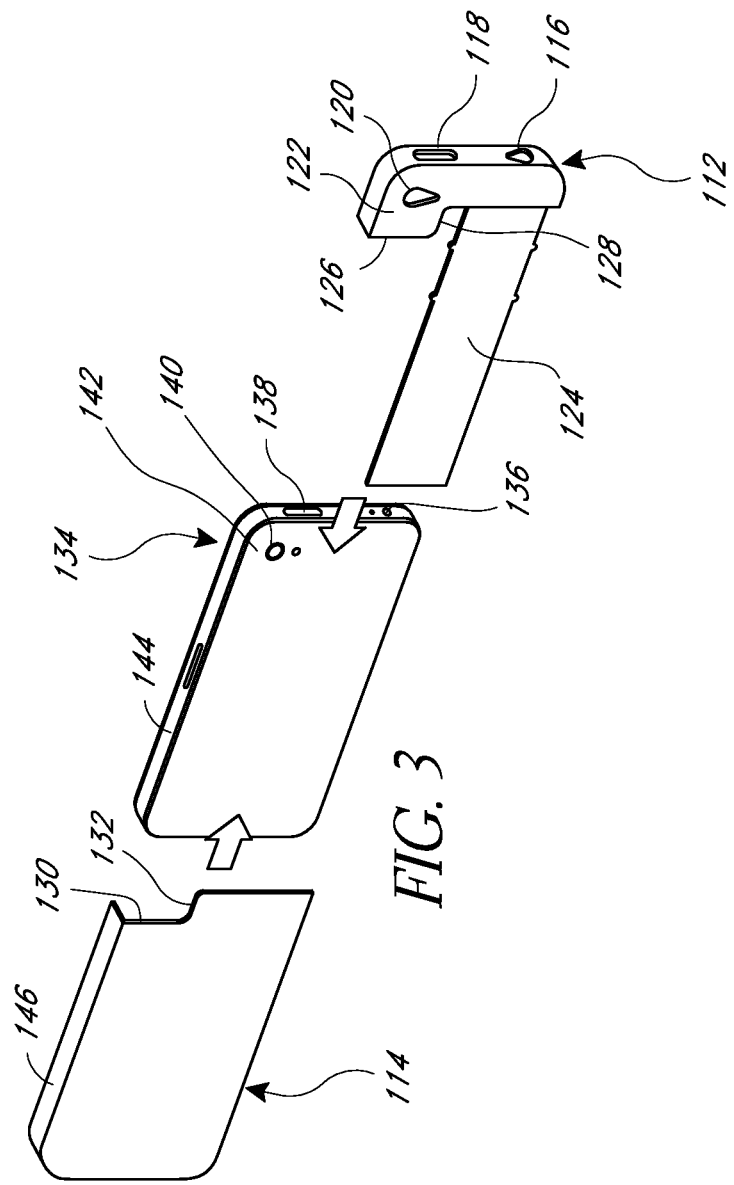

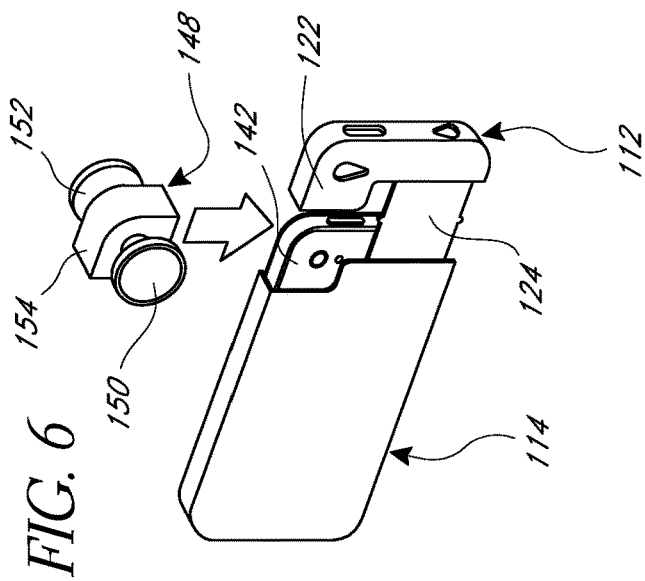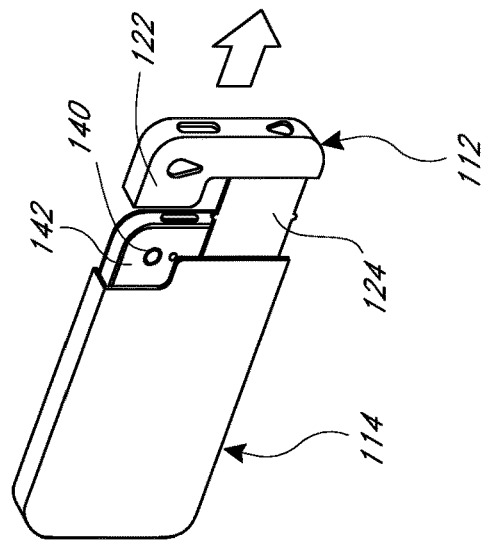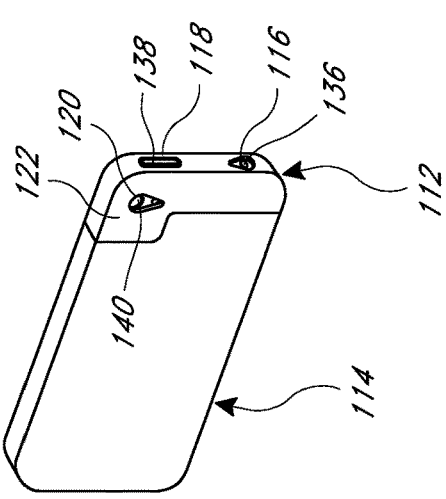

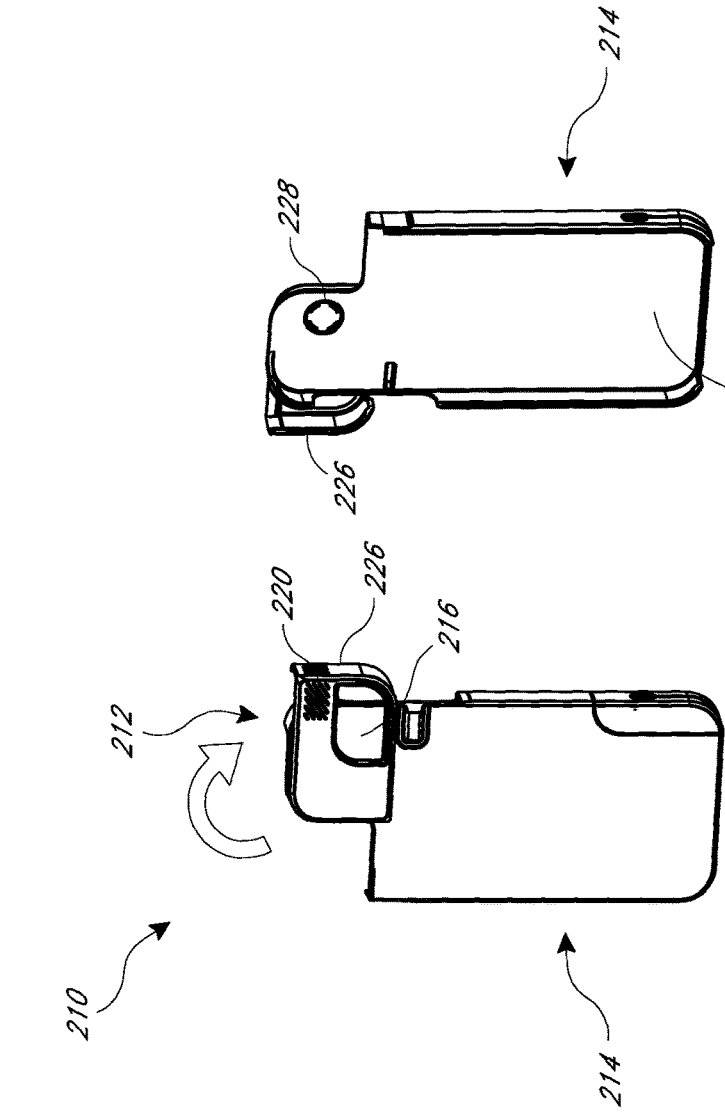

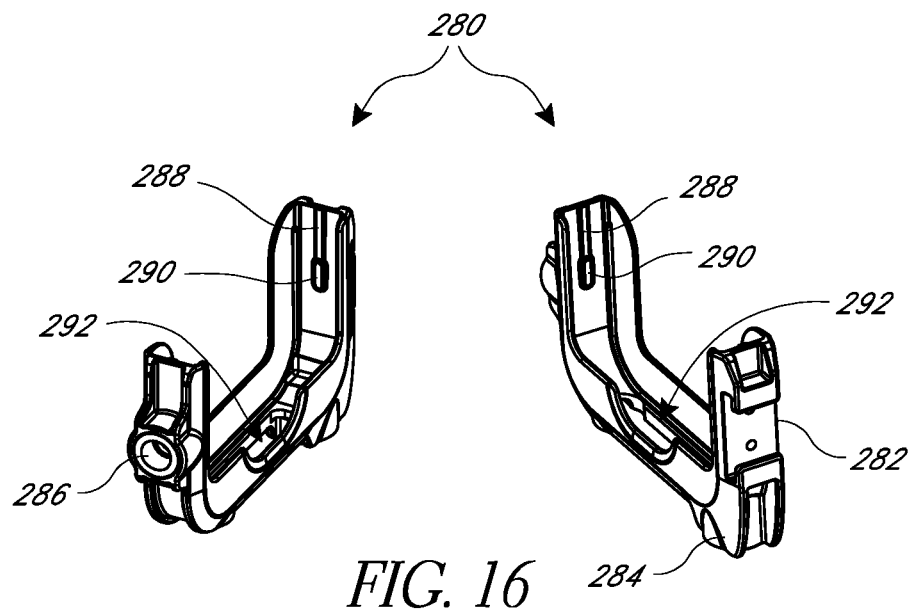
FIG. 16
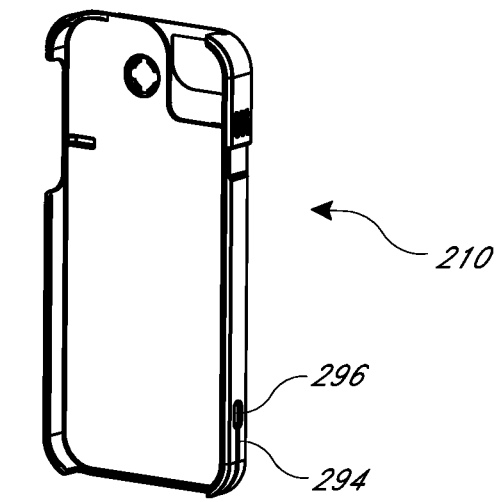
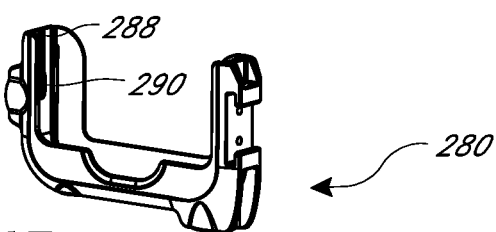
FIG. 17

CASE FOR A COMMUNICATION DEVICE

RELATED APPLICATIONS

This application claims the benefit, under 35 U.S.C. § 119(e), of U.S. Provisional Patent Application No. 61/583,546, filed on Jan. 5, 2012 and entitled "Case for a Communication Device," and U.S. Provisional Patent Application No. 61/585,837, filed on Jan. 12, 2012 and entitled "Case for a Communication Device," the entire contents of both of which are hereby incorporated by reference herein and made part of this specification for all that they disclose.

BACKGROUND OF THE INVENTIONS

Field of the Inventions

This invention relates generally to cases, and specifically to cases for communication devices (e.g., mobile telephones, mobile texting devices, electronic pad devices, laptop computers, desktop computers, gaming devices, and/or devices capable of linking electronically to another device or to a network such as the Internet, etc.)

Description of the Related Art

In recent years, many advances in computer networking and processing technology have made it possible for communication devices to include cameras that permit users to capture images. In many cases, these images can be stored, processed, and transmitted. However, there are many design constraints on onboard cameras in communication devices that can limit the weight, size, expense, shape, adjustability, and overall quality of the lensing systems of such cameras. Consequently, many cameras in communications devices are inadequate for a wide variety of photographic needs and may produce poor quality photographic images.

The deficiencies of onboard camera lenses can be addressed by modular or detachable lensing systems. Such lensing systems may be mounted or attached to communication devices such that one or more auxiliary lenses are positioned substantially over the onboard camera lenses of the communication devices. The auxiliary lenses can enhance or alter the light that may be captured by the onboard cameras to generate an image.

Other accessories may be used with communication devices, such as protective cases. A case is intended to provide protection for the communication device, and inhibit wear and/or damage to the communication device. Conventionally, protective cases cover the exterior of the communication device, or some portion thereof, to cushion impacts, protect against scratches, and the like.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 1 is a perspective view of an illustrative case for a communication device, the case having a first case portion and a second case portion, the first case portions being movable relative to each other.

FIG. 2 illustrates the case of FIG. 1, with the first case portion moved away from the second case portion.

FIG. 3 illustrates the case of FIG. 1, with the addition of a mobile communication device.

FIG. 4 illustrates the case of FIG. 1, with the mobile communication device covered in part by the case.

FIG. 5 illustrates the case of FIG. 1, with the first case portion being moved away again from the second case portion, thereby exposing a corner area of the mobile communication device.

FIG. 6 illustrates the case of FIG. 1, with the addition of a removably attachable lens component configured to fit over the corner area of the communication device.

FIG. 10 is a perspective view of another illustrative case for a communication device, having a first case portion and a second case portion, the first case portion able to be pivoted relative the second case portion.

FIG. 11 illustrates the case of FIG. 10, with the first case portion pivoted relative to the second case portion.

FIG. 12 illustrates the case of FIG. 10, with the first case portion pivoted relative to the second case portion, from an opposite perspective view of that of FIG. 11.

FIG. 16 illustrates a tripod mount for a case, such as the cases of FIGS. 1 and 10.

FIG. 17 illustrates the tripod mount of FIG. 16 ready for installation on the case of FIG. 10.

DETAILED DESCRIPTION OF EMBODIMENTS

Figure 8:
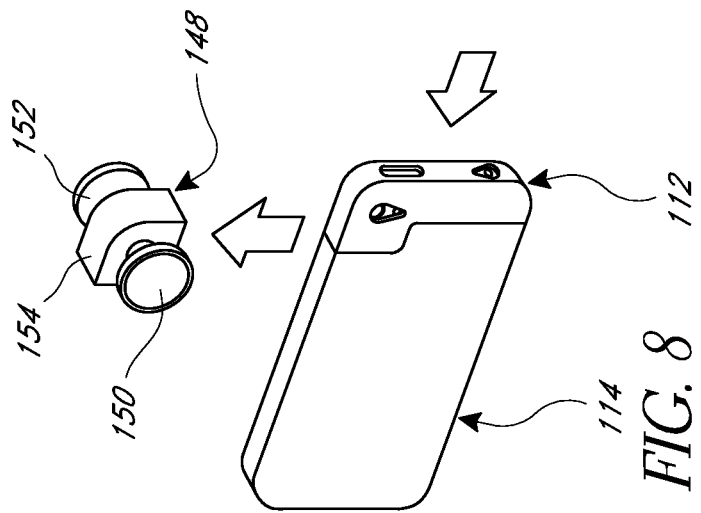
FIG. 8 illustrates the case of FIG. 1, with the lens component removed.

The following detailed description is now directed to certain specific examples of embodiments of the disclosure. In this description, reference is made to the drawings wherein like parts are designated with like numerals throughout the description and the drawings. The inventions are not limited to the examples expressly illustrated or described in this specification.

The present disclosure relates generally to protective cases for communication devices. Protective cases can cover the exterior of communication devices (e.g., mobile phones) or some portion thereof to cushion impacts, protect against scratches, and the like. Protective cases can include cutaways or openings for accessing features and components of the communication device on which the cases are installed, such as screens, buttons, etc. However, it can be difficult to attach an accessory or some other auxiliary structure to a communication device when the communication device is generally surrounded by the protective case. For example, the protective case may not permit direct access to the communication device, or the auxiliary structure may be specially sized for attachment to a communication device with a housing of a particular shape and size. As a result, the auxiliary structure may not fit appropriately on the communication device when the communication device is covered by the protective case.

In some embodiments, a protective case, also referred to herein simply as a case, can be made up of at least two separate portions. A first portion of the case may be moved relative to a second portion of the case in order to expose or otherwise allow access to at least a portion of the communication device contained therein. For example, a user may pivot, rotate, or slide a first portion of the case relative to a second portion of the case in order to expose a component of the communication device, such as an onboard camera lens. Once the user has exposed the component of the communication device, the user may then attach or otherwise use an accessory or other auxiliary structure with the exposed component (e.g., use an auxiliary lensing system with the onboard camera lens). As used herein, the term "lens" is used in accordance with its customary meaning and encompasses structures that change or divert the direct of light travel and/or those that change the wavelength or intensity of light or otherwise provide a translucent barrier or change an optical quality. When the user has finished using the accessory, the user may remove the accessory or other auxiliary structure and move the first portion of the case back to its original position relative the second portion of the case. This can provide improved protection for the communication device than a case that permanently exposes the particular component of the communication device, while also allowing use of accessories that may otherwise not be available for use with cases that cover the particular component of the communication device.

In some embodiments, the first portion of the case can be moved, relative to the second portion of the case, from a first "closed" portion to a second "open" position while retaining a connection between the first and second case portions. As a result, an onboard camera or some other component of the mobile communication device may be exposed while retaining the attachment between the case and the mobile communication device In some embodiments, modular components may be used with a protective case to provide additional features when desired, and which may be omitted when a user wishes only to use the protective case. For example, a modular protective case system may include a protective case and additional components, such as auxiliary batteries, camera flashes, tripod mounts, and the like which may be selective used according to the wishes of the user.

Although aspects of the embodiments described in the disclosure will focus, for the purpose of illustration, on use of an auxiliary lensing system and other photography components with the communication devices on which the protective cases are installed, the structures and techniques disclosed herein may be applied to any accessory or auxiliary structure. Various aspects of some embodiments will now be described with regard to certain examples and which are intended to illustrate but not limit the disclosure.

Referring now to FIGS. 1 and 2, an example of a case 110 is illustrated. In some embodiments, as illustrated, the case 110 can generally comprise at least a first case portion 112 and a second case portion 114. Either or both of the case portions 112, 114 can be movable relative to the other. In some embodiments, the first case portion 112 can comprise an entirely separate or separable piece from that of the second case portion 114. The movable first case portion 112 can be configured to move from at least a first position in which the first case portion 112 covers a specified area of a communication device, to a second position wherein a specified area of the communication device is exposed (e.g., made accessible for contact, securement, and/or other communications). In some embodiments, the specified area can comprise at least two generally parallel or at least two generally orthogonal sides of a mobile communication device, such as a corner of a mobile communication device. In some embodiments, the exposed area on the mobile communication device can include an onboard camera lens. In some embodiments, as illustrated, the exposed area encompasses the onboard camera lens and its close vicinity, extending across less then either of the full distance across the horizontal width and/or vertical height of the communication device. In some embodiments, the first case portion 112 can be configured to reciprocate or otherwise move from a first position in which the first case portion 112 covers the corner of the mobile communication device (and onboard camera lens) to a second position in which the corner of the mobile communication device is exposed. In some embodiments, the first case portion 112 and/or second case portion 114 can be configured such that relative movement of the case portions 112, 114 additionally exposes only the corner of a mobile communication device (or another area on the communication device that includes the onboard camera lens), and no other additional portion of the mobile communication device. For example, in the open configuration, the remainder of the case can continue to cover substantially or entirely the same area of the communication device as in the closed position (e.g., substantially the entire communication device except for the viewing area, the electronic access ports, control buttons, and/or speaker or microphone openings).

In some embodiments, as illustrated, the first portion 112 remains in substantially longitudinal alignment with the second portion 114 in both the open and closed positions. In some embodiments, the transition between the open and closed positions can be bistable (e.g., the first and second portions are not biased toward or away from either the open or closed positions). As illustrated, the onboard lens can be unobstructed by the first and second portions 112, 114 in the open configuration. Also, in both the open and closed positions, the first and second portions can remain in contact, such as in sliding surface contact along a substantial portion of the length of the first portion 112, as illustrated.

The first case portion 112 can include one or more openings configured to permit access to buttons, displays, plug-in locations, or other structures on a communications device when the first case portion 112 is in its first (i.e. closed) position. For example, with reference to FIG. 1, the first case portion 112 can include openings 116, 118 configured to allow access to buttons or structures along the top of a communication device. The first case portion 112 can further include an opening 120, configured to permit access to an underlying onboard camera lens of the communication device.

In some embodiments, the first case portion 112 can comprise a case corner portion 122, and a case attachment portion 124. The case corner portion 122 can be configured to cover the corner of a communication device, whereas the case attachment portion 124 can be configured to attach (e.g. permanently or removably couple) the first case portion 112 to the second case portion 114. As illustrated in FIG. 2, the case attachment portion 124 can comprise a thin, elongate structure, though other structures are also possible. In some embodiments, the second case portion 114 can be configured to receive the case attachment portion 124. For example, the second case portion 114 can include retaining structures, such as grooves, slots, etc. (not shown) that are configured to receive and/or hold the case attachment portion 124. In some embodiments, as illustrated, the case attachment portion 124 can slide onto or within one or more portions of the second case portion 114.

With continued reference to FIGS. 1 and 2, the first case portion 112 can include interior edges 126, 128. The edges 126, 128 can be located on the case corner portion 122. The edges 126, 128 can be configured to mate with and/or contact corresponding edges 130, 132 along the second case portion 114. Thus, when the first case portion 112 is in its first (i.e. closed) position, the case corner portion 122 can cover the corner of a communication device, and the edges 126, 128 can be positioned near, pressed against, or come into contact with, corresponding interior edges 130, 132, respectively, of the second case portion 114.

With reference to FIG. 3, and as described above, a communication device 134, including but not limited to a mobile communication device (e.g. an iPhone mobile phone made by Apple, Inc.) can be used with the case 110. The communication device 134 can include buttons and/or plug-in locations 136, 138 along a top portion of the communication device 134. The openings 116, 118 on the first case portion 112 can be configured to generally match and/or align with these buttons and/or plug-in locations 136, 138. The communication device 134 can further include an onboard camera lens 140 that is located, for example, generally within a corner area 142 of the communication device 134. The opening 120 on the first case portion 112 can be configured to generally match and/or generally align with the opening 120, and the case corner portion 122 can be configured to cover the front corner area 142 when the case corner portion 122 is in its first (i.e. closed) position.

The communication device 134 can further include at least one side portion 144. To attach the communication device 134 to the case 110, the second case portion 114 can be moved along the communication device 134, as illustrated by the arrow in FIG. 3, such that the side portion 144 slides alongside the underside of a protruding portion 146 of the second case portion 114. The first case portion 112 can reciprocate or otherwise move along the communication device 134, in a generally opposite direction, as illustrated by the arrow in FIG. 3, such that the case corner portion 122 covers the corner area 142 of the communication device 134, and the case attachment portion 124 slides between the communication device 134 and the second case portion 114.

FIG. 4 illustrates the case 110 covering, at least in part, the communication device 134, with the first and second case portions 112, 114, fully closed together, and the first case portion being in its first (i.e. closed) position. As illustrated in FIG. 4, the corner area 142 of the communication device (or at least a front portion of the corner area 142 along the communication device 134) is fully covered. Thus, the only access to the buttons and/or plug-in areas 136, 138, and the onboard camera lens 140, is through the openings 116, 118, 120 along the first case portion 112.

Figure 7:
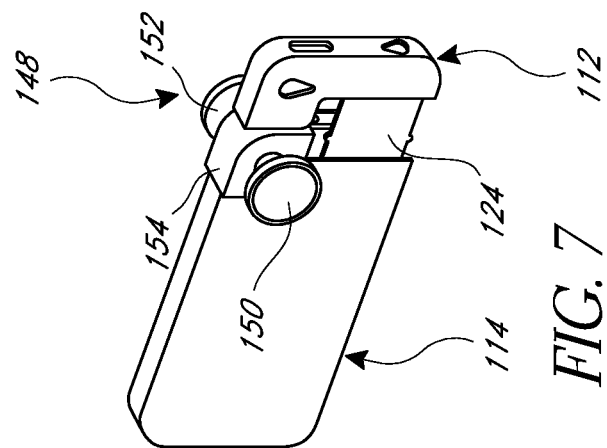
FIG. 7 illustrates the case of FIG. 1, with the removably attachable lens component attached to the communication device, and the first and second case portions pressed against the lens component.

With reference to FIGS. 5-7, an advantage of some embodiments of the cases described herein is that they can be used to permit temporary access to a particular area along the communication device 134. More specifically, the case 110 can be used to permit temporary access to the corner area 142 so that an auxiliary lens component 148 can be attached to the communication device in the corner area 142.

The lens component 148 can generally comprise at least one auxiliary lens to be used in conjunction with the onboard camera lens 140. In some embodiments the lens component 148 can comprise both a first lens 150 and a second lens 152, to be used interchangeably. The lens component 148 can further comprise a retainer portion 154. The retainer portion 154 can generally be configured to be removably attachable to a communication device such that the lens 150, 152 can be positioned in a region generally covering or near an onboard camera lens in the communication device to enable the lens portion 150, 152 to cooperate optically with the onboard camera lens 140, to provide optical enhancements, improvements, modifications, and/or alternatives. For example, the retainer portion 154 can be shaped and sized specifically to fit over the corner area 142 of communication device 134, such that the lens 150, 152 is positioned generally in front of the onboard camera lens 140.

In some embodiments, the retainer portion 154 can be shaped so as to attach to the communication device 134 in a region and in a manner that permits a user to see all or virtually all of a viewing portion (not shown) of the communication device without obstruction or without appreciate obstruction. In some embodiments the retainer portion 154 can comprise a channel (not shown) with a plurality of sidewalls. The width of the channel, e.g., the distance between the respective sidewalls, can be configured to be generally complimentary to the thickness of a portion of the communication device(s) on which the retainer portion 154 is configured to attach. In some embodiments, the natural width of the channel can be approximately the same size or slightly smaller than the thickness of a corner, such as corner portion 142 of communication device 134. In some cases, the lens component 148 would not be attachable to the communication device 134 while the communication device 134 is covered by the case, unless the first portion 112 (or second portion 114) is moved to expose the corner portion 142.

In some embodiments, one or more of the plurality of walls of the retainer portion 154 can have a curvilinear shape along one or more edges to permit the retainer portion 154 to provide increased distance of contact along the edge of the communication device while diminishing the area across a transverse surface of the device that is obstructed by the retainer portion 154. For example, in some embodiments, the curvilinear shape along one or more edges of the walls can permit the retainer portion 154 to extend along a portion of two converging outer edges of the communication device that is approximately as wide as the lens 150, 152, while diminishing the amount of space on the front of the communication device that is blocked.

All or part of the retainer portion 154 can be made of a material (e.g., a polymer or a silicone) that is sufficiently flexible to permit a degree of bending or stretching, so that the channel of the retainer portion 154 can be temporarily widened while sliding the lens component 148 onto the communication device, but that is sufficiently stiff, rigid, or resilient to urge one or more of the plurality of walls to return to its original position and thereby exert a gripping force against a portion of the communication device. The material of the retainer portion 154, especially the region on the inner side of the walls within the channel, can also be tacky or somewhat slide resistant to enhance the gripping of the retainer portion to the communication device.

With reference to FIGS. 4-6, in order to attach the retainer portion 154 and the lens component 148 to the communication device 134, the first case portion 112 can first be reciprocated or otherwise moved away from the second case portion 114. The first case portion 112 can be moved from its first position, in which the corner area 142 is covered, to a second position, in which the corner area 142 is exposed, as shown in FIG. 5. In some embodiments, movement of the first case portion 112 from its first position to its second position can involve generally linear movement of the first case portion 114, as illustrated by the arrow in FIG. 5. A user can simply pull on the first case portion 112, sliding the case attachment portion 124 away from the second case portion 114, and sliding the case corner portion 122 away from the corner area 142 on the communication device 134, thus fully exposing the corner area 142 on the communication device 134 (e.g., exposing the front and rear sides and the corner edge surface between the front and rear sides) or exposing at least the onboard lens of the communication device 134. In some embodiments, and as illustrated in FIG. 5, movement of the first case portion 112 away from the second case portion 114 only fully exposes the corner area 142 of the communication device 134, without fully exposing any other portion of the communication device 134.

In some embodiments, as illustrated, the exposed area extends across less than the entire width of the communication device 134 and/or extends across less than the entire length of the communication device 134. In some embodiments, the additional front or rear surface area exposed by movement of the case to the open position, while still retaining the communication device 134 therein, is substantially less than or approximately equal to one-quarter of the surface area of either the front or rear side of the communication device 134.

With continued reference to FIGS. 6 and 7, when the corner area 142 of the communication device 134 is fully exposed, the lens component 148 can be attached to the communication device 134 on both the front and rear surfaces in a manner that permits simultaneous contact with generally orthogonal sides of the communication device 134. For example, the retainer portion 154 of lens component 148 can be attached to (e.g. slid over) the corner area 142 of the communication device 134, as illustrated in FIG. 7. The lens component 148 can snap into place, and/or be held by a frictional fit, without the use of any mounting structure such as fasteners, clips, etc. on the communication device 134. In some embodiments, with the lens component 148 in place, the first case portion 112 can be moved back towards the second case portion 114, such that the first and second case portions 112, 114 press against one another and facilitate holding the lens component 148 in place. In some embodiments, the first and/or second portions 112, 114 can be biased toward the closed positions, such as with an internal spring or other resilient member.

After use of the lens component 148 is complete, the first case portion 112 can be moved away from the second case portion 114, and as illustrated in FIG. 8, the lens component 148 can be pulled off of the corner portion 142 and the first case portion 112 can then be moved back towards its first position such that the first case portion 112 again covers the corner portion 142.

Figure 9A:
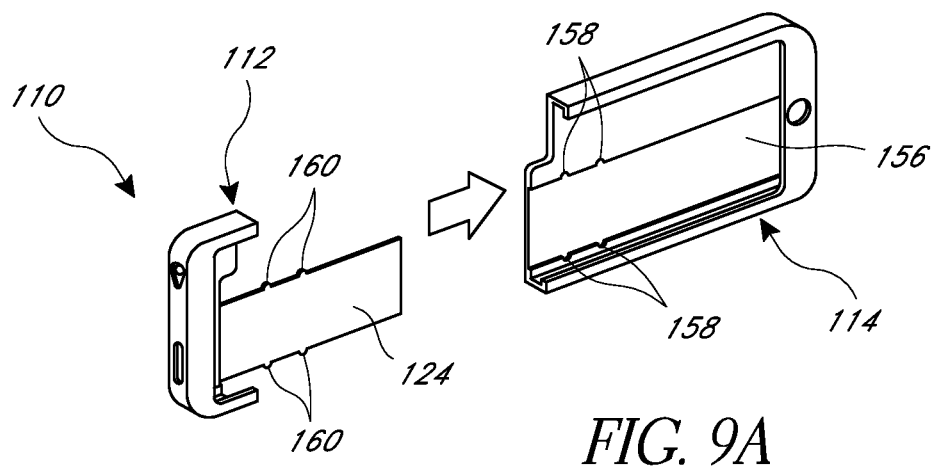
FIG. 9A illustrates the case of FIG. 1, from an opposite perspective view of that of FIG. 1.
Figure 9B:
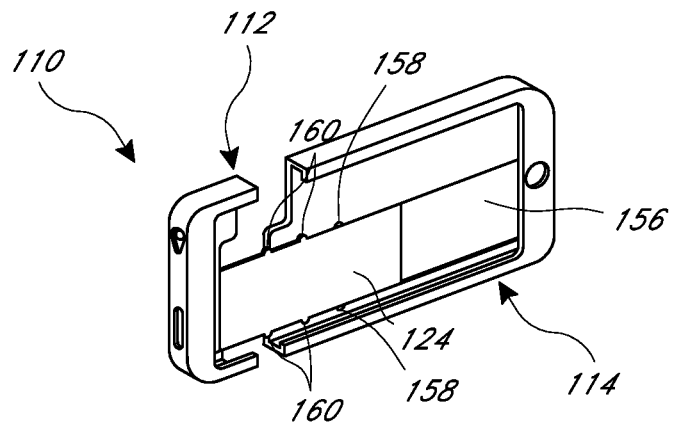
FIG. 9B illustrates the case of FIG. 1, in a partially closed position.
Figure 9C:
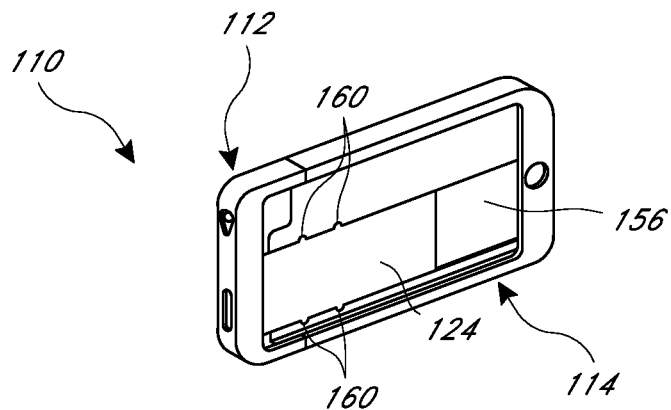
FIG. 9C illustrates the case of FIG. 1 in a fully closed position.

FIGS. 9A-9C illustrate the case of FIG. 1, from an opposite perspective view of that of FIG. 1. As illustrated in FIG. 9A, and as described above, in some embodiments the case attachment portion 124 can slide onto or within one or more portions of the second case portion 114. For example, the second case portion 114 can include a channel 156, and the case attachment portion 124 can slide within the channel 156. The second case portion 114 can include one or more first positioners, such as notches 158. The notches 158 can be located along the channel 156. The case attachment portion 124 of the first case portion 112 can include corresponding second positioners, such as protrusions 160. The one or more protrusions 160 can be configured to engage the one or more notches 158, such that the first case portion 112 can be engaged with the second case portion 114 in a plurality of different discrete, temporary stopping positions that resist movement by an increased amount (e.g., requiring more force to effectuate movement) than other portions of the first case portion 112.

For example, as illustrated in FIG. 9B, the first case portion 112 can be positioned in a partially closed position (e.g. as also seen in FIG. 7), wherein the first case portion 112 and second case portion 114 are not fully closed, and wherein a space exists between the first case portion 112 and second case portion 114. This space between the first case portion 112 and second case portion 114 can be sized to accommodate the lens component 148. In the position illustrated in FIG. 9B, two of the protrusions 160 can be engaged with two of the corresponding notches 158. As illustrated in FIG. 9C, when the first and second case portions 112, 114 are fully closed, each of the protrusions 160 can fit within their corresponding notches 158. The notches and protrusions 160, 158 can facilitate and/or stabilize the relative positions of the first and second case portions 112, 114.

In some embodiments, the case 110 can include an externally accessible actuator for enabling user communication with the communication device, such as an external shutter release button. The shutter release button can be used to initiate a photograph capture procedure or "release a shutter" on the onboard camera of the communication device 134. The shutter release button can be interfaced with the communication device 134. For example, the shutter release button can be interfaced with the communication device 134 through a wired connector on the bottom of the communication device 134, via Bluetooth, or via other wireless means.

In some embodiments, the case 110 can include one or more externally accessible actuators for changing the quality or other characteristics of the image produced by the camera, such as an actuator for controlling a zoom of the communication device 134. The externally accessible actuators can be similar to the externally accessible actuator for the shutter release button, described above. For example, the case can include a manually manipulable zoom adjustment element, such as a zoom-in and/or a zoom-out button, lever, or rotatable actuator such as a thumb wheel, etc. (not shown). The zoom-in and zoom-out adjustment element can be used to influence a zoom lens or digital zoom feature of the communication device 134. In some embodiments, the zoom-in and zoom-out adjustment element can be interfaced with the communication device 134 through a wired connector on the bottom of the communication device 134, via Bluetooth, or via other wired or wireless means.

Figure 13:
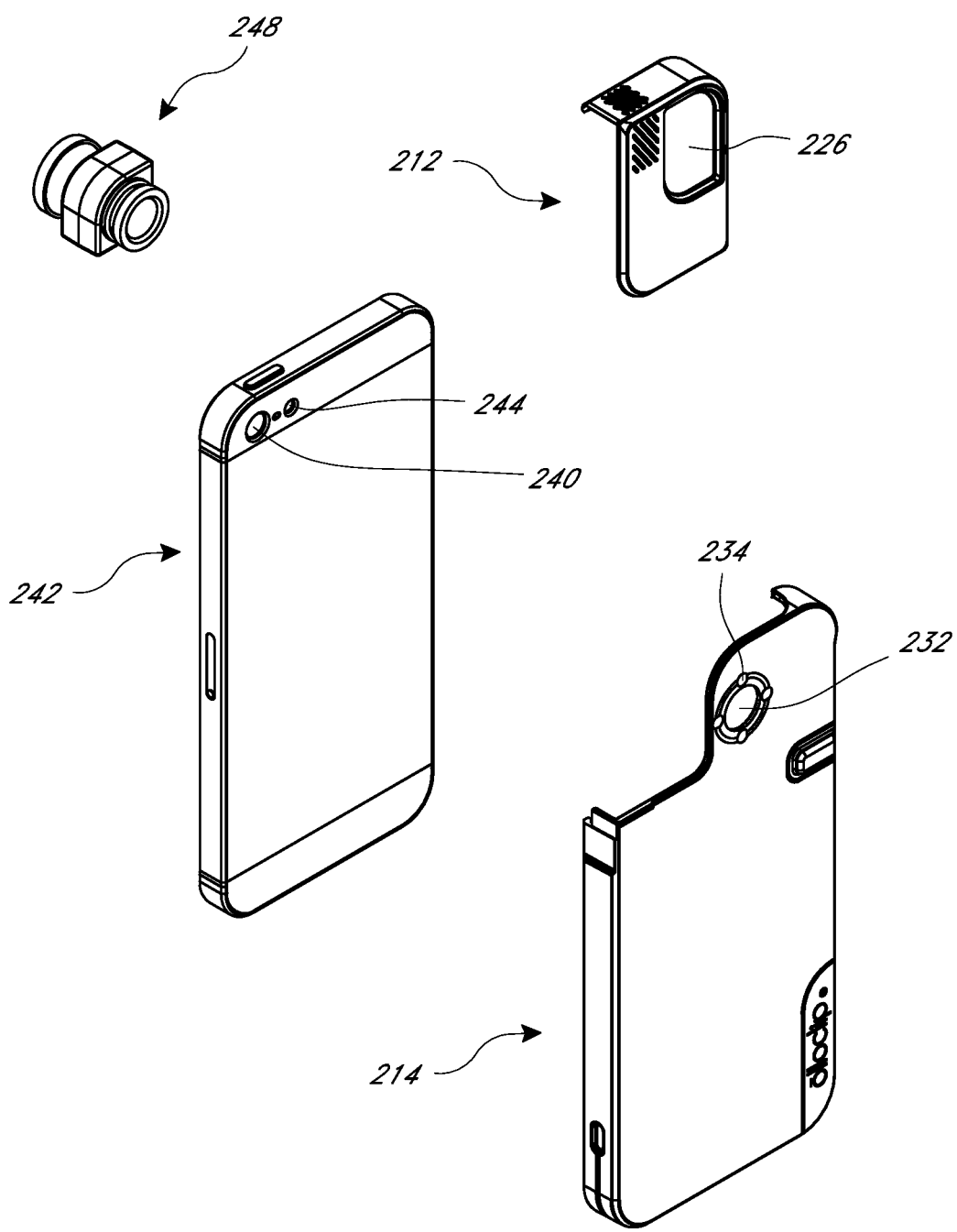
FIG. 13 illustrates the case of FIG. 10, ready for installation on a communication device and allowing further installation of a lens component.
Figure 14:
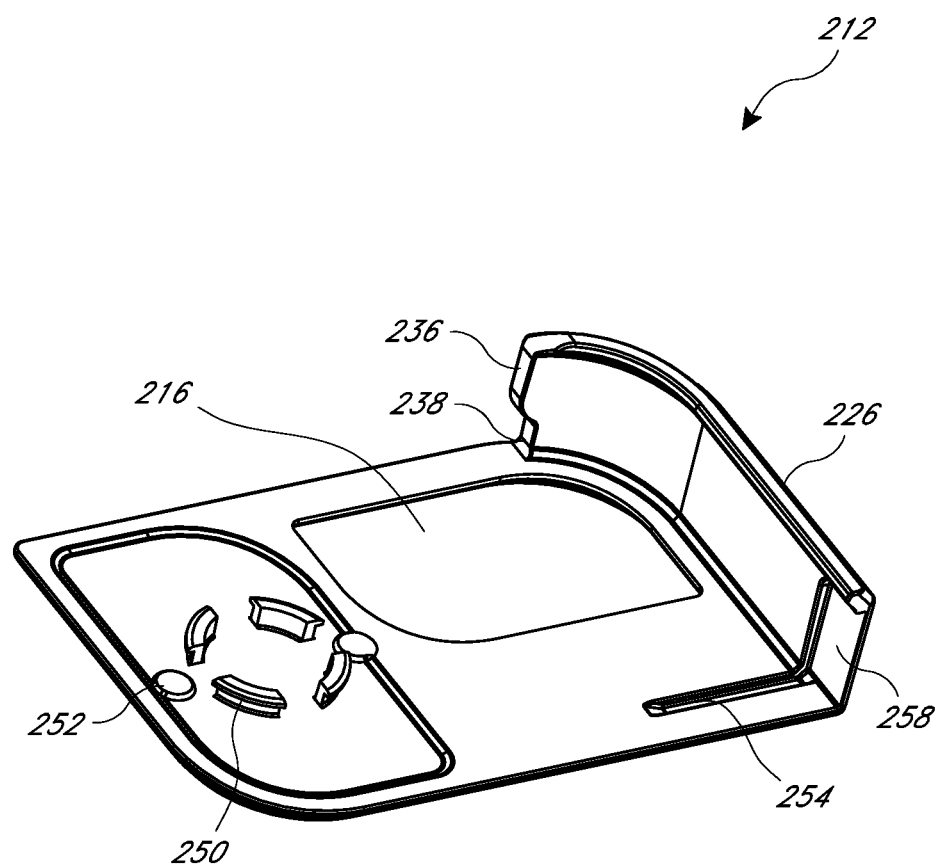
FIG. 14 is a perspective view of an illustrative first case portion that may be pivoted with respect to a second case portion.
Figure 15:
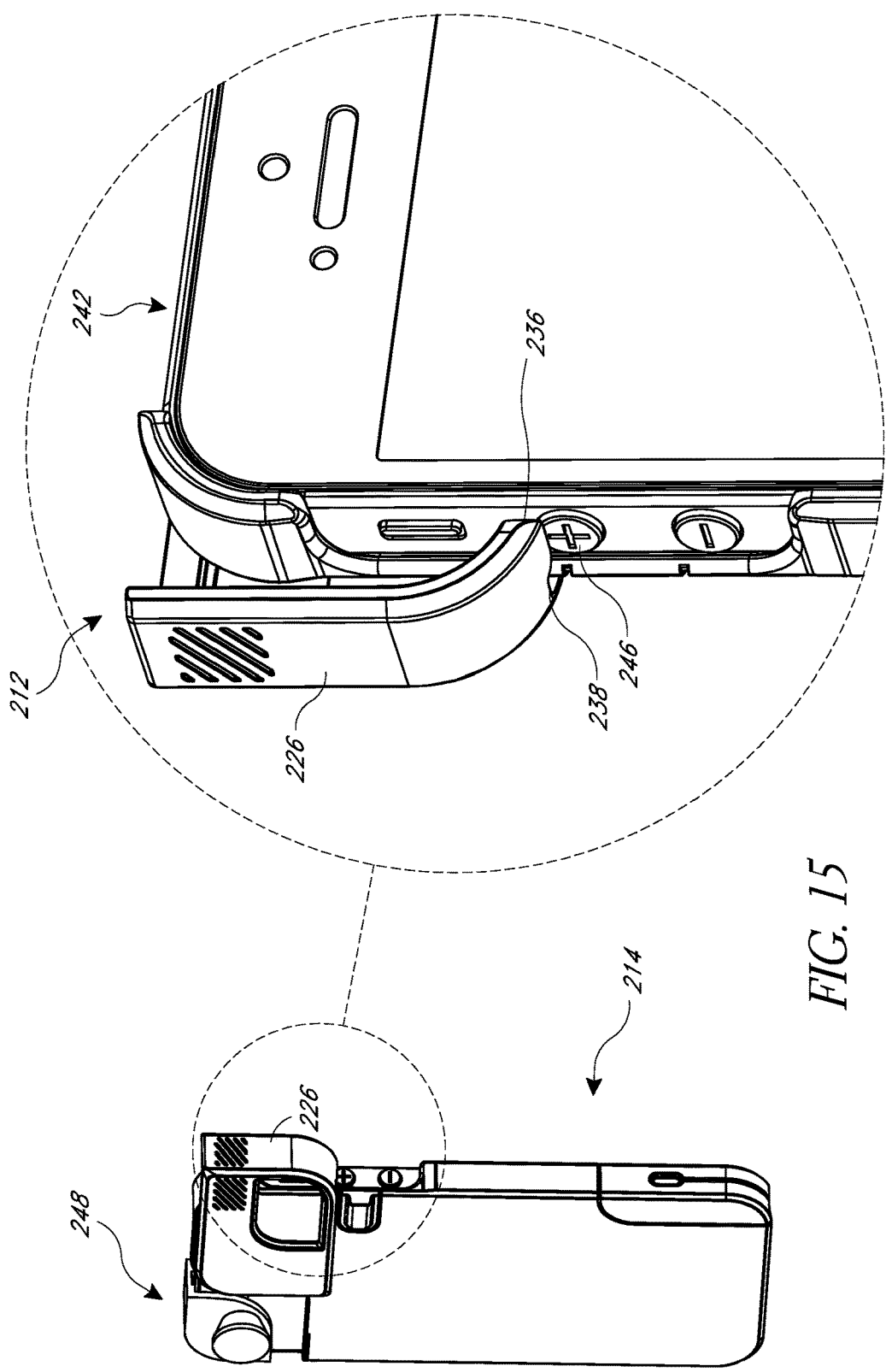
FIG. 15 illustrates the case of FIG. 10, installed on a communication device, with the first portion pivoted with respect to the second portion and configured to activate a button of the communication device.

Turning now to FIGS. 10-15, another illustrative embodiment of a protective case is provided. The case 210 can be similar in some respects to the other cases described herein. For example, the case 210 can include at least a first case portion 212 and a second case portion 214. The first case portion 212 can be movable relative to the second case portion 214. However, rather than being a separate piece that adjusts linearly with respect to the second case portion 214, the first case portion 212 can instead pivot relative to the second case portion 214, as seen in FIG. 11. When a user pivots the first case portion 212 relative to the second case portion 214 (e.g., from a first closed position to a second open position), a corner of a communication device 242 on which the case 210 is installed may be exposed so that a user may attach or otherwise use another accessory with the communication device, such as a lens component 248, as shown in FIGS. 13 and 15.

FIGS. 10 and 11 illustrate the exterior of the case 210 (e.g., the portion that is exposed when the case 210 is installed on a communication device). FIG. 12 illustrates the interior of the case 210 (e.g., the portion that contacts the communication device or is otherwise not exposed with the case 210 is installed on the communication device). As seen in FIG. 12, the second case portion 214 includes an opening 228 generally aligned with or near a midpoint of an upper edge of the second case portion 214. The opening 228 facilitates coupling the first case portion 212 to the second case portion 214. In some embodiments, the opening 228 may be closer to or aligned with a corner of the second case portion 214 rather than the midpoint of an edge of the second case portion 214, allowing for differently-sized first case portions 212 and different pivoting or rotating actions.

Closure components (e.g., clips, tabs, or other protrusions) of the first case portion 212, such as the tabs 250 illustrated in FIG. 14, may be inserted into the opening 228 from the exterior surface 222 of the second case portion 214 towards the interior surface 230 of the second case portion 214, where the tabs may overlap a portion of interior surface 230. The opening 228 may be generally round to facilitate rotating or pivoting of the first case portion 212 with respect to the second case portion 214 while the first case portion 212 remains coupled to the second case portion 214. In some embodiments, a plug or cap (not shown) may be inserted into or placed adjacent to the opening 228 on the interior surface 230 in order to mate with the first case portion 212 and position a portion of the second case portion 214 between the plug and the first case portion 212, thereby coupling the first case portion 212 to the second case portion 214.

FIG. 13 shows illustrative components on the exterior of the second case portion 214 that facilitate coupling the first case portion 212 to the second case portion, and that facilitate pivoting the first case portion 212 relative to the second case portion 214. FIG. 14 shows corresponding components on the interior of the first case portion 212. The first case portion 212 illustrated in FIG. 14 includes closure components (e.g., tabs 250) that can be inserted into the opening 228 of the second case portion 214 (e.g., as described above). The first case portion 212 also includes protrusions or detents 252 that generally follow the channel 232 of the second case portion 214, shown in FIG. 13, as the first case portion 212 pivots relative to the second case portion 214. The second case portion 214 can include recesses or stops 234 that temporarily inhibit the pivot of the first case portion 212 at a plurality of convenient predetermined positions, such as longitudinally parallel to the second case portion 214, orthogonal to the second case portion 214, etc. As the first case portion 212 is pivoted, the detents 252 follow the channel 232 of the second case portion 214 and temporarily stop when they reach the stops 234, which may be recesses shaped to accept the detents 252. Additional or continued pressure applied to the first case portion 212 by the user can remove the detents 252 from the stops 234 and resume moving the detents along the channel 232, thereby continuing to pivot the first case portion 212.

The first case portion 212 can include a grip portion 220, as seen in FIG. 10. The grip portion 220 can facilitate rotation of the first case portion 212 from the first closed position to a second open position, such as the position illustrated in FIG. 11, or at the predetermined positions defined by the stops 234, as described above. For example, the grip portion 220 can provide ridges, grooves, or an increased coefficient of friction when compared to the remaining surface of the first case portion 212. A user may exert a force on the grip portion 220 of the first case portion 212 (e.g., by using a thumb while gripping the case 210 in the same hand) such that the first case portion 212 pivots away from the second case portion 214, or away from at least a portion of the second case portion 214.

FIG. 13 shows a communication device 242 with multiple input components, including an onboard camera lens 240 and a flash 244. The first case portion 212 can include an opening 216. The opening may be sized and positioned so that a component of the communication device 242, such as an onboard camera lens 240, may be used even when the first case portion 212 is in a first closed position. As illustrated in FIG. 14, the first case portion 212 may also include a channel 254 that communicates with an opening 258. When the first case portion 212 is in a first closed position (e.g., as illustrated in FIG. 10), the first case portion 212 may cover a microphone, which may muffle or otherwise affect the operation of the microphone. However, by configuring the first case portion 212 with a channel 254 at the position of the microphone when the first case portion 212 is in the first closed position, sound may be permitted to enter the microphone via the opening 258 and the channel 254.

In some embodiments, the case 210 may be deeper, from the front surface or face of the communication device to the rear surface of the case 210, at the first case portion 212 than at the second case portion 214 (e.g. the first case portion 212 extends farther from the back of the communication device than the exterior surface 222 of the second case portion 214). In addition, the width of the first case portion 212 may be less than the width of the second case portion 214 (e.g., the first case portion 212 may be less than or equal to approximately ¾, ⅔, or ½ as wide as the second case portion 214). As a result, the back of the communication device, with the case 210 installed, may lack a flat surface. For example, when a user lays the communication device, with the case 210 installed, on its back (e.g., the exterior surface of the case 210 contacts a generally flat surface upon which the communication device is placed), the communication device may wobble between four or more contact points due to the lack of a flat surface or three clear points of contact. A knob, bump, or other protrusion, such as balancing protrusion 224, may be included on the second case portion 214 to provide a third point of contact, along with the first case portion 212 and the bottom edge of the second case portion 214. When the user lays the communication device on its back, with the case 210 installed and configured with the balancing protrusion 224, the communication device may generally remain balanced on the three points of contact. The communication device may also generally tilt toward the user because the first case portion 212 extends farther from the back of the communication device than the second case portion 214. The balancing protrusion 224 may be configured to extend from the exterior surface 222 of the second case portion 214 a distance that is less than the distance that the first case portion 212 extends beyond the exterior surface 222.

FIGS. 13 and 15 show the case 210 before and after attachment to or installation on the communication device 242. The case 210 can be attached to the communication device 242, for example, by simply pressing the case 210 over the rear of the communication device 242 (e.g., over the face of the communication device 242 opposite the face that includes a display) so as not to obstruct a user's view of the of the display. Once the case 210 is pressed over the communication device 242 (or alternatively before the case 210 is pressed over the communication device 242) the first case portion 214 can be pivoted away from the second case portion 214 in a manner that does not obstruct an onboard camera lens 240 of the communication device 242. With the communication device 242 and case 210 pressed together, and the first case portion 212 pivoted away from the second case portion 216, a corner area of the communication device 242 is fully exposed. This permits the introduction and attachment of the lens component 248, as illustrated in FIG. 15. In some embodiments, once the lens component 248 is attached to the communication device 242, the first case portion 212 can then be pivoted back towards the second case portion 214 to press and/or rest against the lens component 248.

As with other embodiments of case 210, once the lens component 248 is no longer desired, the lens component 248 can be removed from communication device 242, and the first case portion 212 can be pivoted back into its first position.

A communication device may provide a button to activate or release a shutter, thereby capturing an image with an onboard camera lens. Protective cases can interfere with access to such buttons, or the buttons may be sized or shaped such that they are difficult to access. The communication device 242 illustrated in FIG. 15 includes a shutter release button 246. In some embodiments, the first case portion 212 may be configured to provide an additional and optionally larger area 226 that can be used to activate the shutter release button 246. The first case portion 212 illustrated in FIG. 15 includes an activation edge 236 that can contact the shutter release button 246 of the communication device 242 when the first case portion is in a second open position. A secondary edge 238 can be configured to avoid interfering with the activation of the shutter release button 246 by allowing the activation edge 236 to be moved farther towards the communication device 242 than the second case portion 212 would otherwise allow.

In operation, a user may pivot the first case portion 212 from a first closed position, illustrated in FIG. 10, to a second open position, illustrated in FIG. 11. The user may then install or attach an auxiliary lens component 248 to the communication device 242, as illustrated in FIG. 15. The user can then activate the shutter release button 246 of the communication device 242 by pressing area 226 of the first case portion 212, thereby capturing an image with the onboard camera lens 240 of the communication device 242 via the lens component 248.

Modular components may be added to the case 210, or the other cases described herein, in order to provide additional features. FIGS. 16 and 17 show an illustrative tripod adapter 280 that may be used in conjunction with the case 210 in order to facilitate the use of a tripod with the communication device 242. The tripod adapter 280 may include one or more tripod mounts 284 and 286. When multiple tripod mounts are included, such as the tripod mounts 284 and 286 illustrated in FIG. 16, the tripod mounts may be position on different edges (e.g., on two edges orthogonal to each other) such that the communication device may capture photographs in either portrait or landscape format, depending upon which tripod mount 284 or 286 is used. Each tripod mount may be a threaded metal insert capable of receiving a standard tripod screw, such as those typically found on photography tripods. In some embodiments, the tripod mounts 284, 286 may be made of brass or aluminum and insert molded with the tripod adapter 280. In some embodiments, the tripod mounts 284, 286 may be substantially the same material as the remainder of the tripod adapter 280.

An external flash accessory (not shown) may be mounted onto the tripod adapter 280 for use with the communication device 242. The tripod adapter 280 illustrated in FIG. 16 includes a shoe 282 for receiving such a flash accessory. The external flash accessory may be controlled by the communication device 242 through a number of different connections or other types of communication. For example, the shoe 280 may be a "hot" shoe that provides a physical connection from the communication device 242 to the flash accessory. As another example, the shoe 282 may be a "cold" shoe. In such cases, the flash accessory may plug into the communication device 242 via a wired connection, or the communication device 242 may control the flash accessory via a wireless connection (e.g., Bluetooth). The shoe 282 may be a metal component (e.g., brass or aluminum) insert molded with the tripod adapter 280, similar to the tripod mounts 284, 286 described above. In some embodiments, the shoe 282 may be made of substantially the same material as the remainder of the tripod adapter 280.

As illustrated in FIG. 17, the tripod adapter 280 (and other modular components that may be used with the case 210) may be installed on the case 210 by sliding the tripod adapter 280 over a portion of the case 210. The case 210 may include a channel 294 on one or more edges of the case 210 (e.g., on a surface orthogonal to the external surface 222 of the first case portion 214). A corresponding raised ridge 288 and protrusion 290 on an internal edge surface of the tripod adapter 280 may fit within the channel 294 to guide installation of the tripod adapter 280 onto the case 210. A recess 296 on case 210 may be configured to accept the protrusion 290 of the tripod adapter 280 and secure the tripod adapter 280 to the case 210 by resisting any movement of the protrusion 290 away from the recess 296 once the protrusion 290 enters the recess 296. In some embodiments, a case 210 may have two more channels 294, such as channels 294 on generally opposite parallel edges of the case 210. The tripod adapter 280 may also have two or more ridges 288 on two or more parallel interior surfaces of the tripod adapter 280. In some embodiments, the tripod adapter 280 may include a channel and/or recess, and the case 210 may include a corresponding ridge and/or protrusion.

Some communication devices may include a port on an edge or other surface. The port may be used to connect an accessory or a cable to the communication device, such as a battery charger, a Universal Serial Bus (USB) cable, a micro USB cable, etc. In some cases, the communication device may include such a port on an edge that may be covered by the tripod adapter 280. The tripod adapter 280 can include an opening 292, as illustrated in FIG. 16, to permit access to the port of the communication device even when the tripod adapter 280 is installed.

Figure 18:
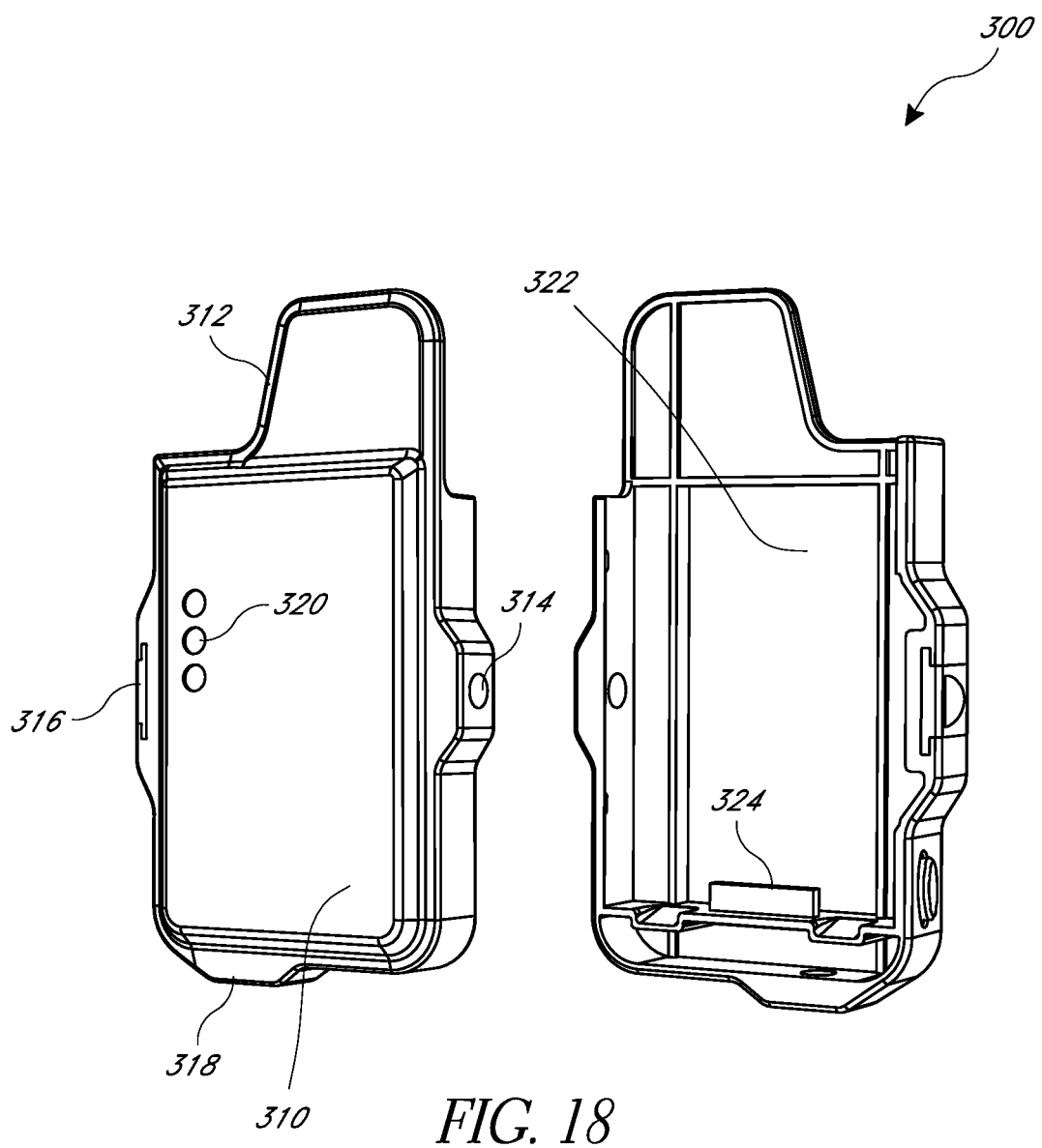
FIG. 18 illustrates a modular battery and camera flash component that may be used with a case for a communication device, such as the cases of FIGS. 1 and 10.

FIG. 18 shows another illustrative modular case component that may be used with the cases 210 or other cases described herein. The modular case component shown in FIG. 18 is a battery module 300. The battery module 300 may include an auxiliary battery 310 to recharge or otherwise supply power the communication device 242 on which the case 210 and battery module 300 are installed. The battery module 300 can include an integrated plug 324 or some other connector to interface with a corresponding port on the communication device and provide power thereto. The battery module 300 does not cover the entire case 210, but is instead configured with edge 312 that permits access to the first case portion 212 and/or a portion of the communication device. For example, the edge 312 may be configured such that a user may pivot the first case portion 212 from a first closed position to a second open position. This configuration can also permit attachment of a lens component 248, as described herein.

Battery modules may include additional components, such as one or more tripod mounts and/or shoes. For example, the battery module 300 shown in FIG. 18 includes tripod mounts 314, 318. The tripod mounts 314, 318 are positioned similar to the tripod mounts 284, 286 of the tripod adapter 280 described above. The tripod mounts 314 may be insert-molded, threaded metal components, or they may be some molded material, similar to the tripod mounts 284, 286 described above. In addition, the battery module 300 includes a shoe 316, similar to the shoe 282 of the tripod adapter 280.

In some embodiments, the battery module 300 can further include a built-in flash 320 in addition to, or instead of, a shoe 316. For example, a portion of the battery module 300 may include one or more LED or other flash bulbs. The flash bulbs may be powered by the battery pack 310. The built-in flash 320 can be used to provide additional lighting for the onboard camera of the communication device. The built-in flash 320 can be interfaced with the communication device. For example, the built-in flash can be interfaced with the communication device through the integrated plug 324 of the battery module 300 and a port or connector of the communication device. In some embodiments, the built-in flash 320 can be interfaced with the communication device via Bluetooth or other wireless means. In some embodiments, the built-in flash 320 can be interfaced with the communication device by sensing an onboard flash of the communication device via a light pipe or other light sensor (not shown). In some embodiments, the flash can be movable (e.g., pivotable, extendable by telescoping, slidable, rotatable) with respect to the case 210.

In some embodiments, the built-in flash 320 can be provided without a power supply. For example, the built-in flash 320 can comprise a reflective light-dispensing portion that is optically connected to a light-conveying member, such as a reflective light pipe or filament, that in turn is optically connected to a light-gathering member positioned near an onboard flash on the communication device. When the onboard flash on the communication device is actuated during the capture of a photograph, the light from the onboard flash can be conveyed through the light-conveying member on the case to the light-dispensing portion on the case and then conveyed to the scene being photographed. In some embodiments, any or all of the flash components (e.g., the light-gathering member and/or the light-conveying member) can be positioned on or otherwise integrated into a lens component 248 itself, rather than on the case 210.

Figure 19:
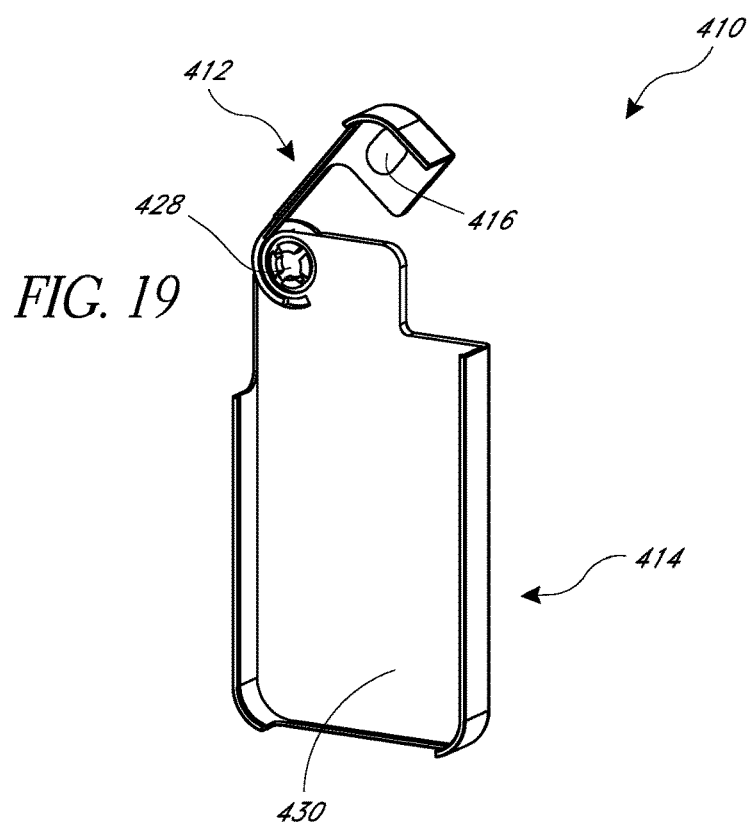
FIG. 19 is a perspective view of another illustrative case for a communication device, having a first case portion and a second case portion, the first case portion able to be pivoted relative the second case portion.
Figure 20:
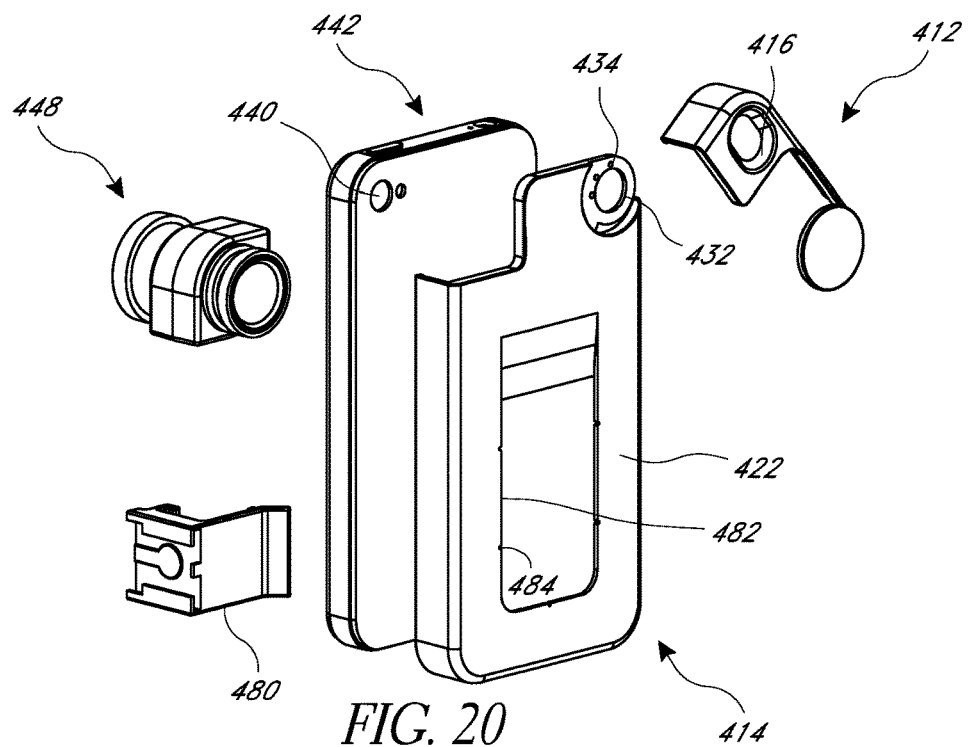
FIG. 20 illustrates the case of FIG. 19, a communication device, and a removable lens component.

FIGS. 19 and 20 show another illustrative case for a communication device. The case 410 shown in FIGS. 19 and 20 may be similar in some respects to the other cases described herein. For example, the case 410 can include at least a first case portion 412 and a second case portion 414. The first case portion 412 can pivot or otherwise move relative to the second case portion 414. When a user pivots the first case portion 412 relative to the second case portion 414 (e.g., from a first closed position to a second open position), a corner of a communication device 442 on which the case 410 is installed may be exposed so that a user may attach or otherwise use another accessory with the communication device, such as a lens component 448, as shown in FIG. 20. In some embodiments, the first case portion 412 may include an opening 416 sized and positioned so that an onboard camera lens 440 of the communication device 442 may be used when the first case portion 412 is in a first closed position. In some embodiments, the opening may be partially or completely covered by glass, a polymer, or some other clear material to provide protection to the onboard camera lens 440 while the first case portion 412 is in a first closed position.

The first case portion 412 may be coupled to the second case portion 414 in a manner similar to the first case portion 212 and second case portion 214 of the case 210 described above. However, rather than being coupled to an opening near the middle of the width of the second case portion 414, the first case portion 412 of FIGS. 19 and 20 may be coupled to an opening 428 at or substantially near a corner of the second case portion 414. For example, the opening 428 may be at a first corner of the second case portion 214 that corresponds to a corner of the communication device 442 sharing one edge with another corner of the communication device that is near an onboard camera 440. The first case portion may then extend across substantially the entire shared edge, and can expose the corner of the communication device 442 near the onboard camera 440 when the first case portion 412 is pivoted relative to the second case portion 414.

FIG. 20 illustrates a shoe attachment 480, such as a cold shoe for an external flash accessory, that may be coupled to or otherwise installed on the case 410. The shoe 480 may overlap and clip onto an edge 482 provided on the exterior surface 422 of the second case portion 414. The edge 482 may define a recess in the exterior surface 422 of the second case portion 414. By overlapping the edge 482 can clipping into the recess defined by the edge 482, the shoe 480 may be held in place such that it does not easily move laterally with respect to the case 410 and does not decouple from the case 410 unintentionally. The shoe 480, or a clip portion thereof, may be biased such that it exerts a pinching force upon the case 410 to removably couple the shoe 480 to the case 410. Notches 484 may be provided at discrete locations along the edge 482, and configured to accept a detent or other protrusion (not shown) on the clip of the shoe 480. When the protrusion is within a notch 484, the shoe 280 may be held in place such that it does not easily move longitudinally with respect to the case 410.

Figure 21:
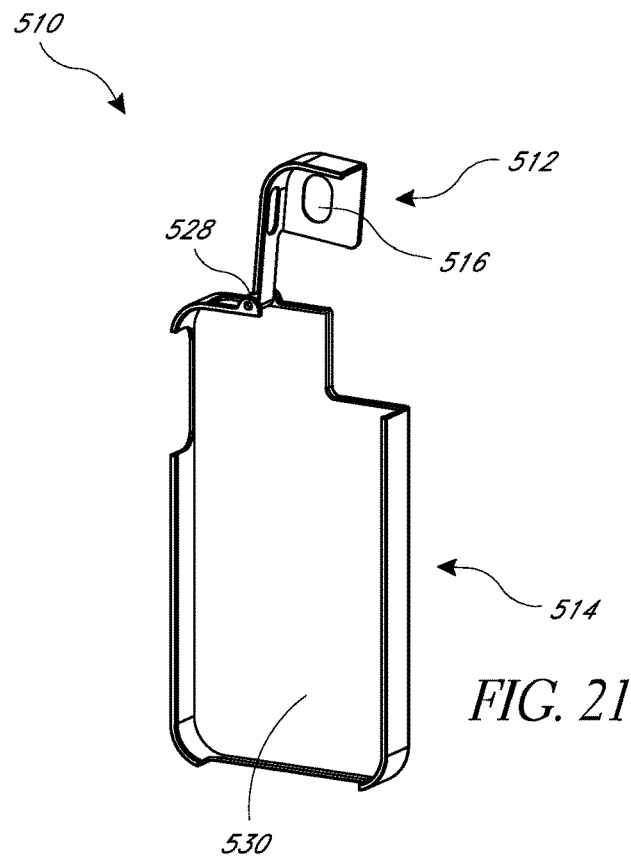
FIG. 21 is a perspective view of another illustrative case for a communication device, having a first case portion and a second case portion, the first case portion able to be pivoted relative the second case portion.
Figure 22:
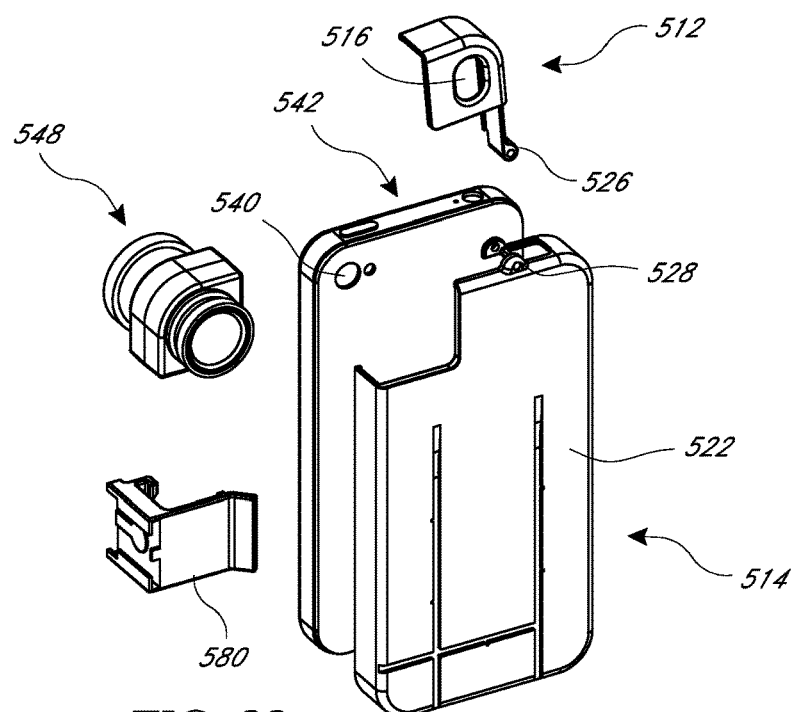
FIG. 22 illustrates the case of FIG. 21, a communication device, and a removable lens component.

FIGS. 21 and 22 show another illustrative case for a communication device. The case 510 shown in FIGS. 21 and 22 may be similar in some respects to the other cases described herein. For example, the case 510 can include at least a first case portion 512 and a second case portion 514. The first case portion 512 can pivot or otherwise move relative to the second case portion 514. When a user pivots the first case portion 512 relative to the second case portion 514 (e.g., from a first closed position to a second open position), a corner of a communication device 542 on which the case 510 is installed may be exposed so that a user may attach or otherwise use another accessory with the communication device, such as a lens component 548, as shown in FIG. 22. In some embodiments, the first case portion 512 may include an opening 516 sized and positioned so that an onboard camera lens 540 of the communication device 542 may be used when the first case portion 512 is in a first closed position.

The first case portion 512 may be coupled to the second case portion 514 by a hinge 528. For example, the hinge 528 may be a pin hinge or a barrel hinge. A pin may extend through two or more ringed or tubular openings positioned on an edge of the second case portion 514 and at least one ring or hollow cylinder 526 positioned on the first case portion 512. In some configurations, the first case portion 512 may rotate about the hinge 528, thereby exposing a corner of a communication device 542 and allowing installation of a lens component 548 for use with the onboard camera 540 located on the exposed corner of the communication device 542.

As shown in FIG. 22, a shoe 580 may be provided for use with the case 510, similar to the shoe 480 described above. Channels may be provided on the exterior surface 522 of the second case portion 514 to facilitate coupling the shoe 580 to the case 510 in a manner similar to that described above with respect to the case 410 of FIG. 20.

Figure 23:
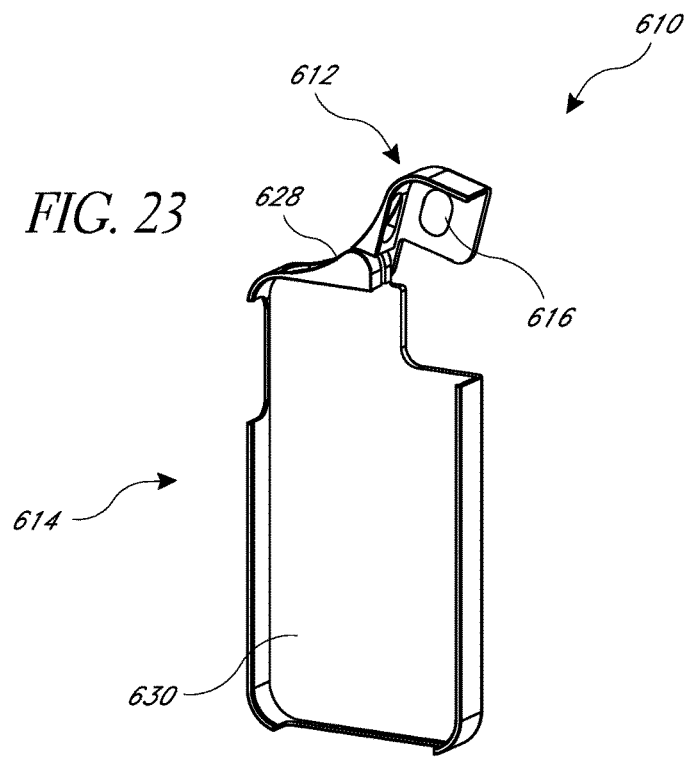
FIG. 23 is a perspective view of another illustrative case for a communication device, having a first case portion and a second case portion, the first case portion able to be pivoted relative the second case portion.
Figure 24:
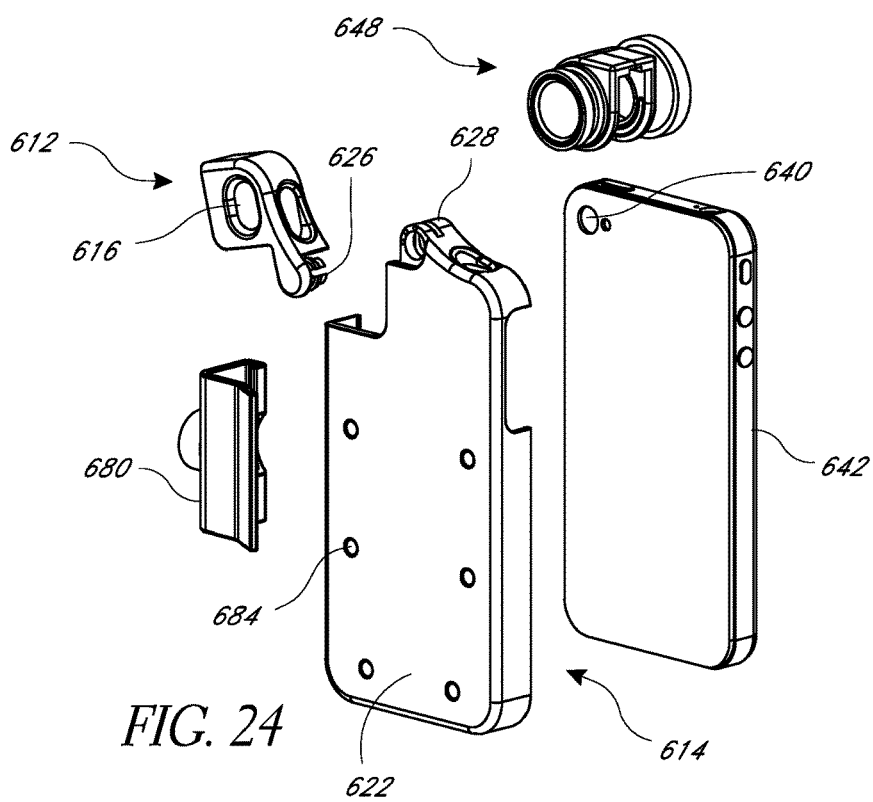
FIG. 24 illustrates the case of FIG. 23, a communication device, and a removable lens component.

FIGS. 23 and 24 show another illustrative case for a communication device. The case 610 shown in FIGS. 23 and 24 may be similar in some respects to the other cases described herein. For example, the case 610 can include at least a first case portion 612 and a second case portion 614. The first case portion 612 can pivot or otherwise move relative to the second case portion 614. When a user pivots the first case portion 612 relative to the second case portion 614 (e.g., from a first closed position to a second open position), a corner of a communication device 642 on which the case 610 is installed may be exposed so that a user may attach or otherwise use another accessory with the communication device, such as a lens component 648, as shown in FIG. 24. In some embodiments, the first case portion 612 may include an opening 616 sized and positioned so that an onboard camera lens 640 of the communication device 642 may be used when the first case portion 612 is in a first closed position.

The first case portion 612 may be coupled to the second case portion 614 by a swivel joint. For example, a connector (e.g., post, rod, or cylinder), such as post 626 shown in FIG. 24, may extend from the first case portion 612 into a generally round opening of a swivel adapter, such as the swivel adapter 628 on the upper edge of the of the second case portion 614 (e.g., the structure that defines the opening extends above an edge of the communication device 642 upon which the case 610 is installed). The post 626 may include a raised ring that is accepted by a channel within the swivel adapter 628, permanently or temporarily preventing removal or decoupling of the first case portion 612 from the second case portion 614. The first case portion 612 may rotate about the swivel adapter 628, thereby exposing a corner of a communication device 642 and allowing installation of a lens component 648 for use with the onboard camera 640 located on the exposed corner of the communication device 642. The first case portion 612 may include one or more detents or protrusions (not shown) that can be accepted by one or more notches on the swivel adapter 628, temporarily impeding rotation of the first case portion 612 at one or more discrete positions.

As shown in FIG. 24, a shoe 680 may be provided for use with the case 610, similar to the shoes 480 and 580 described above. Notches 684 may be provided on the exterior surface 622 of the second case portion 614 to facilitate coupling the shoe 680 to the case 610 in a manner similar to that described above with respect to the cases 410 and 510 of FIGS. 20 and 22. For example, the shoe 680 may include two protrusions that are accepted by two notches 684, thereby holding the shoe 680 substantially stationary. The shoe 680 may include several notches 684 or sets of notches 684 to provide a user with multiple discrete mounting positions for the shoe 680.

Figure 25:
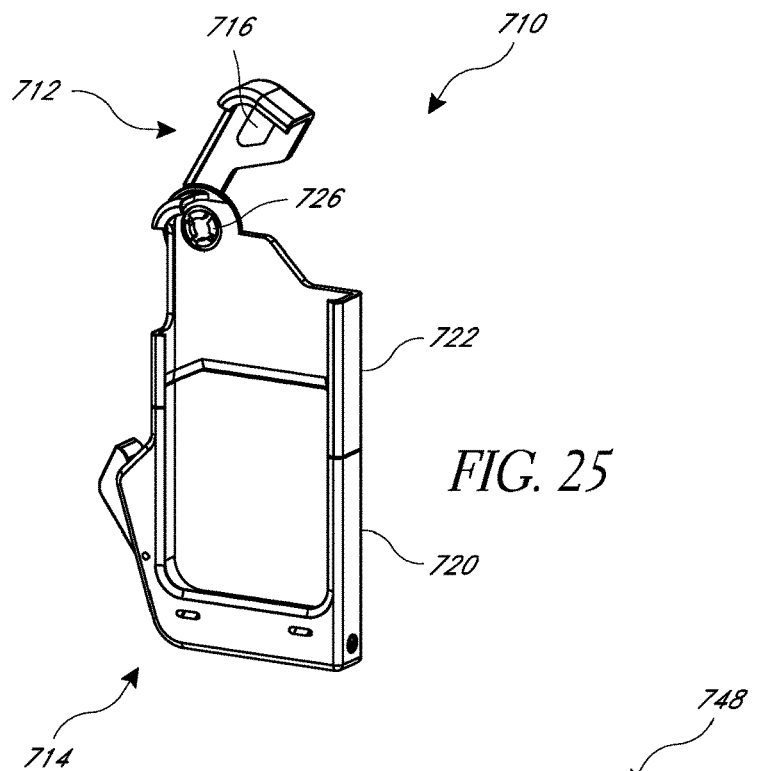
FIG. 25 is a perspective view of another illustrative case with an integrated camera flash for a communication device, having a first case portion and a second case portion, the first case portion able to be pivoted relative the second case portion.
Figure 26:
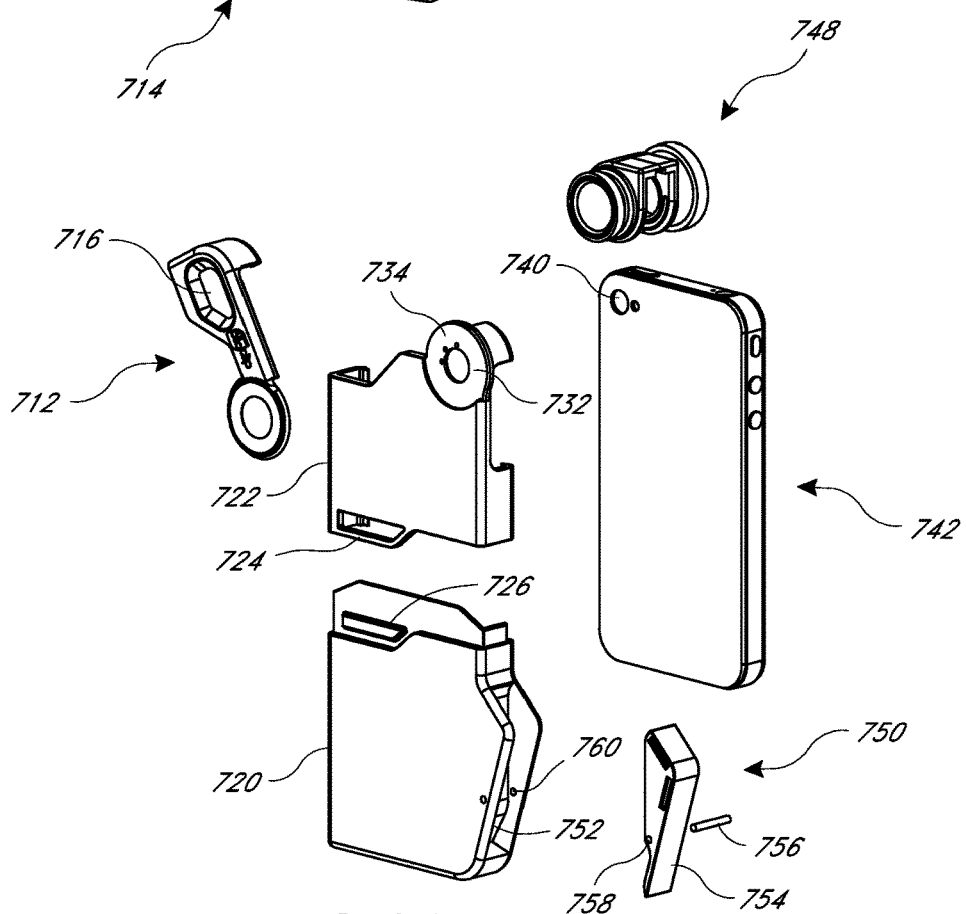
FIG. 26 illustrates the case of FIG. 25, a communication device, and a removable lens component.

FIGS. 25 and 26 show another illustrative case for a communication device. The case 710 shown in FIGS. 25 and 26 may be similar in some respects to the other cases described herein. For example, the case 710 can include at least a first case portion 712 and a second case portion 714. The first case portion 712 may be coupled to the second case portion 714 by a living hinge and/or any other type of mechanical hinge which permits the first case portion 712 to pivot away from the second case portion 714, as described herein. When a user pivots the first case portion 712 relative to the second case portion 714 (e.g., from a first closed position to a second open position), a corner of a communication device 742 on which the case 710 is installed may be exposed so that a user may attach or otherwise use another accessory with the communication device, such as a lens component 748, as shown in FIG. 26. In some embodiments, the first case portion 712 may include an opening 716 sized and positioned so that an onboard camera lens 740 of the communication device 742 may be used when the first case portion 712 is in a first closed position.

The second case portion 714 can include an integrated pop-up flash component 750. The flash component 750 may initially be hidden from view within a recess of the second case portion 714. For example, the flash component 750 may be coupled to the second case portion 714 with a pin hinge such that the flash component 750 may be pivoted, rotated, or otherwise moved from a first closed position to a second open position. A pin 756 may be inserted through openings 760 of the second case portion 714 and a tube or cylinder 758 of the flash component 750. When a user presses on a particular exterior surface of the flash component 750, such as by pressing surface 754 of the flash component 750 towards surface 752 of the second case portion 714, the flash component 750 may partially rotate about the hinge, exposing one or more bulbs. The operation of the bulbs may be controlled by a physical or wireless connection to the communication device 742. The bulbs may be powered by a battery integrated into the case 710, or by the communication device 742.

In some embodiments, the second case portion 714 may itself be composed of two or more sub-portions, such as a first sub-portion 720 and a second sub-portion 722. The first sub-portion 720 may be coupled to the second sub-portion 722 and held in place by a connection system comprising a first connector, such as an opening 724 that is configured to receive or otherwise contact a second connector, such as a tab or protrusion 726 of the first sub-portion 720, as shown in FIG. 26. A first sub-portion 720 may be a modular component that includes a flash component 750, an integrated battery, or other auxiliary components for use with the communication device 752. The first sub-portion 720 may be replaced by other sub-portions (not shown) that exclude one or more of the auxiliary components (e.g., to reduce weight and/or size when such components are not needed) or that include other auxiliary components. The second sub-portion 722 includes the components for coupling to a first case portion 712, as described above, that will be used regardless of which modular first sub-portion is used at a particular time.

In some embodiments, as illustrated, the auxiliary lens is not temporarily and/or not permanently located on, within, and/or attached to, any component of the case itself. Rather, the auxiliary lens may be separate or separable from the case, and can be removed from the mobile communication device and/or case when needed, while the mobile communication device remains attached to the case.

While the cases 110, 210, 410, 510, 610, and 710 described above are described in the context of having a separate, first case portion that slides linearly away from a second case portion, or a first case portion that is connected to and pivots or rotates away from a second case portion, other case configurations and movements of case portions are also possible. An advantage of some embodiments described herein is facilitating temporary access to a particular region of a communication device, while keeping the remainder of the communication device covered, such that a device such as lens component (or other device) can be attached directly to the communication device. Various other modifications and configurations may also be possible, including but not limited to cases having more than two case portions, and/or case portions that are configured to move in more than one degree of freedom, etc., so as to achieve the same desired effect.

In some embodiments, the portion of the case that is configured to move to expose a portion of a mobile communication device can comprise an exterior surface that is generally flush with, generally blends with, or is generally complimentary or continuous with, one or more adjacent non-moving edges of the case. In this way, the case, when in a closed position, can appear generally integral and aesthetically pleasing. In some embodiments, the portion of the case that is configured to move may be made of substantially the same material as the other portion or portions of the case.

In some embodiments, the case can provide protection for the underlying communication device and also permit quick, easy, and temporary access to very specific portions of the communication device. In some embodiments, the case can be formed from various materials, including polymers (e.g., polycarbonate) and/or metals (e.g., aluminum), etc. In some embodiments, different case portions can be formed from a plurality of different materials and/or methods. For example, at least a portion of the case can be formed using a multi-step molding process, such as multi-shot injection molding, inserting molding, or overmolding, and/or the case can include a coating, such as an adhesive, paint, or deposited film, to provide a region on the interior and/or exterior of the case that has a different durometer or appearance than another portion of the case. In some embodiments, a harder shell or interior can be provided in conjunction with a softer interior or exterior surface that provides enhanced grippability for a user's hand and/or provides improved cushioning and impact resistance for the communication device.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention.

The following is claimed:

1. A case configured to be removably attachable to a communication device that is configured to be removably attachable to an auxiliary component, the case comprising:
    a first case portion with a width and a height, the first case portion being configured to at least partially cover a portion of an edge of a communication device adjacent to an onboard camera of the communication device when the first case portion is in a first closed position, the width of the first case portion being less than a width of the communication device, wherein the first case portion comprises an opening to permit use of the onboard camera when the first case portion is in the first closed position; and
    a second case portion coupled to the first case portion at an upper portion of the second case portion, wherein the first case portion is configured to move, relative to the second case portion, from the first closed position to a second open position in which the covered portion of the edge of the communication device is exposed, and a portion of the front face and a portion of the rear face of the communication device is exposed;
    wherein, in the second open position:
        an auxiliary component to the communication device for use with the onboard camera of the communication device is positionable on the portion of the edge, the front face, and the rear face of the communication device that is exposed; and
        when the auxiliary component is positioned on the communication device, the first case portion engages the auxiliary component while maintaining an unobstructed field of view of the onboard camera.

2. The case of claim 1, wherein the first case portion is configured to pivot, relative to the second case portion, from the first closed position to the second open position.

3. The case of claim 1, further comprising a third case portion removably attachable to the second case portion, wherein the third case portion provides a second auxiliary component for use with the communication device.

4. The case of claim 3, wherein the second auxiliary component comprises a tripod mount, a shoe, a flash component, or a battery.

5. A case configured to be removably attachable to a communication device with an onboard camera, a top edge, a bottom edge, a first vertical edge, a second vertical edge, a front face, and a rear face, the case comprising:
    a first case portion comprising a first vertical edge and a second vertical edge, the first case portion being configured to at least partially cover, when the first case portion is in a first position, a first area of a communication device, the first area comprising a portion of the top edge, a portion of the front face, and a portion of the rear face, the first area including the onboard camera of the communication device, and the distance between the first vertical edge and the second vertical edge of the first case portion being less than the distance between the first vertical edge and the second vertical edge of the communication device, wherein the first case portion comprises an opening to permit use of the onboard camera when the first case portion is in the first closed position; and a second case portion coupled to the first case portion, wherein the first case portion is configured to move, relative to the second case portion, from the first position to a second position in which the first area of the communication device is exposed to permit attachment of an auxiliary lens component in optical communication with the onboard camera of the communication device to the first area;

wherein, when the auxiliary lens component is attached to the communication device, the first case portion abuts the auxiliary lens component in the second position while maintaining an unobstructed field of view of the auxiliary lens component.

6. The case of claim 5, wherein the first area comprises a first corner area of the communication device, and wherein the first corner area is exposed to permit attachment of an auxiliary lens component to the first corner area when the first case portion is in the second position.

7. The case of claim 5, wherein the first case portion is configured, when in the second position, to actuate a button of the communication device in response to user pressure on the first case portion.

8. The case of claim 5, wherein the first case portion is configured to pivot, relative to the second case portion, from the first position to the second position.

9. The case of claim 5, further comprising a third case portion removably attachable to the second case portion, wherein the third case portion provides a second auxiliary component for use with the communication device.

10. The case of claim 9, wherein the second case portion is configured to establish an electrical connection between the communication device and the second auxiliary component.

11. The case of claim 9, wherein the second auxiliary component is configured to communicate wirelessly with the communication device.

12. The case of claim 1, wherein the second case portion maintains an offset from the communication device during a movement between the first closed position and the second open position.

13. The case of claim 8, wherein, in the second position, the second case portion is configured to prevent pivoting of the first case portion beyond the second position.

* * * * *